United States Patent
Peng

(10) Patent No.: US 12,431,958 B2
(45) Date of Patent: Sep. 30, 2025

(54) UNICAST COMMUNICATION METHOD AND APPARATUS

(71) Applicant: HUAWEI TECHNOLOGIES CO., LTD., GuangDong (CN)

(72) Inventor: Wenjie Peng, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 393 days.

(21) Appl. No.: 17/993,255

(22) Filed: Nov. 23, 2022

(65) Prior Publication Data

US 2023/0082590 A1 Mar. 16, 2023

Related U.S. Application Data

(63) Continuation of application No. PCT/CN2021/093385, filed on May 12, 2021.

(30) Foreign Application Priority Data

May 27, 2020 (CN) .......................... 202010459752.X

(51) Int. Cl.
*H04B 7/155* (2006.01)
*H04B 17/318* (2015.01)
*H04W 76/10* (2018.01)

(52) U.S. Cl.
CPC .......... *H04B 7/155* (2013.01); *H04B 17/318* (2015.01); *H04W 76/10* (2018.02)

(58) Field of Classification Search
CPC ...... H04W 76/10; H04W 76/00; H04B 7/155; H04B 17/318; H04B 7/14
See application file for complete search history.

(56) References Cited

U.S. PATENT DOCUMENTS

| | | | |
|---|---|---|---|
| 9,967,918 B2* | 5/2018 | Yi | H04W 88/04 |
| 10,194,471 B2* | 1/2019 | Li | H04W 40/22 |

(Continued)

FOREIGN PATENT DOCUMENTS

| | | |
|---|---|---|
| CN | 101790218 A | 7/2010 |
| CN | 105430633 A | 3/2016 |

(Continued)

OTHER PUBLICATIONS

Vivo, Solution to support UE-to-UE Relay connection establishment, SA WG2 Meeting #136, Nov. 18-22, 2019, Reno, USA, S2-1911477, 2 pages.

(Continued)

*Primary Examiner* — Tuan H Nguyen
(74) *Attorney, Agent, or Firm* — Rimon PC

(57) ABSTRACT

This application provides a unicast communication method and apparatus. The method includes: A first relay device receives a first message sent by a first terminal device, where the first message includes a first identifier of a second terminal device. The first relay device sends a second message to the second terminal device when transmission quality of the first message meets a first preset condition, where the second message is for establishing a first unicast connection, and the first unicast connection is a unicast connection established between the first terminal device and the second terminal device through the first relay device. According to the unicast communication method provided in this application, an appropriate relay device is selected in a unicast connection establishment process. This helps improve a success rate of the unicast connection and communication quality of unicast communication.

20 Claims, 15 Drawing Sheets

UE 1

Relay device

UE 2

(56) References Cited

U.S. PATENT DOCUMENTS

| | | |
|---|---|---|
| 2016/0337935 A1 | 11/2016 | Patil et al. |
| 2019/0349069 A1 | 11/2019 | Gandikota et al. |

FOREIGN PATENT DOCUMENTS

| | | | |
|---|---|---|---|
| CN | 108809897 A | 11/2018 | |
| CN | 110461020 A | 11/2019 | |
| CN | 110602801 A | 12/2019 | |
| CN | 110611940 A | 12/2019 | |
| EP | 4013180 A1 | 6/2022 | |
| EP | 4135406 A1 | 2/2023 | |
| EP | 4145945 A1 | 3/2023 | |
| WO | 2017055157 A1 | 4/2017 | |
| WO | 2019154074 A1 | 8/2019 | |

OTHER PUBLICATIONS

CATT, Solution to support UE-to-UE Relay, SA WG2 Meeting #136, Nov. 18-22, 2019, Reno, USA, S2-1911451, 3 pages.

Qualcomm Incorporated, UE-to-UE Relay solution based on IP. SA WG2 Meeting #136, Reno, NV, USA, Nov. 18-22, 2019, S2-1911923, 4 pages.

\* cited by examiner

600

A first relay device receives a first message sent by a first terminal device, where the first message includes a first identifier of a second terminal device — S610

The first relay device sends a second message to the second terminal device when transmission quality of the first message meets a first preset condition — S620

700

| A first relay device receives a first message sent by a second terminal device, where the first message includes a service identifier of the second terminal device | S710 |

| The first relay device determines, based on the service identifier, to send a second message to the second terminal device | S720 |

| A first relay device receives a first message sent by a first terminal device, where the first message is for requesting to establish a second unicast connection | S810 |

| The first relay device sends, to a third terminal device, a second message and a corresponding service identifier for establishing the second unicast connection | S820 |

| A second terminal device receives a first message sent by at least one candidate relay device, where the first message includes a first identifier of the second terminal device | S910 |

| The second terminal device sends, when transmission quality of the first message meets a first preset condition, a second message to at least one candidate relay device that meets the first preset condition; or when transmission quality of the first message does not meet a first preset condition, the second terminal device discards the first message or makes no response | S920 |

A second terminal device sends a first message to at least one candidate relay device, where the first message includes a service identifier of the second terminal device, and a unicast connection has been established between the second terminal device and the at least one candidate relay device ~ S1010

A first terminal device sends a first message to at least one candidate relay device, where the first message includes a first identifier of a second terminal ~ S1110

The first terminal receives a second message sent by the at least one candidate relay device, where the second message includes the first identifier of the second terminal device ~ S1120

The first terminal device sends a third message to a first relay device when transmission quality of the second message meets a first preset condition ~ S1130

A first terminal device generates a first message, where the first message is for requesting to establish a second unicast connection ~ S1210

The first terminal device sends the first message to at least one candidate relay device ~ S1220

FIG. 12

UNICAST COMMUNICATION METHOD AND APPARATUS

CROSS-REFERENCE TO RELATED APPLICATIONS

This application is a continuation of International Application No. PCT/CN2021/093385, filed on May 12, 2021, which claims priority to Chinese Patent Application No. 202010459752.X, filed on May 27, 2020. The disclosures of the aforementioned applications are herein incorporated by reference in their entireties.

TECHNICAL FIELD

This application relates to the communication field, and more specifically, to a unicast communication method and apparatus.

BACKGROUND

In a wireless communication system, data communication may be performed between user equipments (UEs) via a network, or communication may be directly performed between UEs not through a network device. An interface between the UEs is referred to as a PC5 interface, similar to a Uu interface between a UE and a base station. A link between the UEs is referred to as a sidelink (SL). Data transmission is directly performed through the sidelink but not via the network. In this way, a communication delay can be effectively reduced.

The sidelink supports broadcast, unicast, and multicast. Unicast communication is similar to data communication performed after a radio resource control (RRC) connection is established between a UE and a base station, and a unicast connection needs to be first established between the two UEs.

When the UEs communicate with each other through the sidelink, a communication distance can not very long due to factors such as an insufficient hardware capability of a transmit-side UE. This limits a scenario in which the UEs communicate with each other through the sidelink. To resolve this problem, a UE-to-UE relay architecture is introduced into discussions in a standard. Data or signaling transmission may be performed between two UEs through a relay device (a relay UE).

In an actual application process, there may be a plurality of relay UEs between an initiating UE (a UE 1) and a target UE (a UE 2) between which unicast communication is required. There may be no determined relationship between the UE 1, the UE 2, and each of the plurality of relay UEs, and not all of the relay UEs are appropriate for both the UE 1 and the UE 2 between which the unicast communication is required. In a conventional technology, there is no good method for selecting a relay UE in a process of establishing a unicast connection between the UE 1 and the UE 2.

SUMMARY

This application provides a unicast communication method, to help improve a success rate of a unicast connection and communication quality of unicast communication by selecting an appropriate relay device in a unicast connection establishment process.

According to a first aspect, a unicast communication method is provided. The method includes: A first relay device receives a first message sent by a first terminal device, where the first message includes a first identifier of a second terminal device. The first relay device sends a second message to the second terminal device when transmission quality of the first message meets a first preset condition, where the second message is for establishing a first unicast connection, and the first unicast connection is a unicast connection established between the first terminal device and the second terminal device through the first relay device.

The first relay device participates in determining the transmission quality of the first message, so that different cases that exist between an initiating UE and the relay device can be considered in a unicast connection process, to select an appropriate relay device. This improves a success rate of the unicast connection and quality of unicast communication.

With reference to the first aspect, in some implementations of the first aspect, that transmission quality of the first message meets a first preset condition includes: A reference signal received power RSRP of the first message is greater than or equal to a first threshold.

Optionally, the first relay device may alternatively perform determining the transmission quality of the first message based on an SNR, an SINR, RSRQ, CSI, or the like of the first message.

With reference to the first aspect, in some implementations of the first aspect, the method further includes: The first relay device receives a third message sent by the second terminal device, where the third message includes the first identifier of the second terminal device. The first relay device forwards the third message to the first terminal device when transmission quality of the third message meets a second preset condition.

The relay device performs determining of the transmission quality of the third message sent by a target UE, so that different cases that exist between the relay device and the target UE can be considered, and a relay device that is more appropriate for the target UE can be selected. This improves the success rate of the unicast connection and the quality of the unicast communication.

With reference to the first aspect, in some implementations of the first aspect, that transmission quality of the third message meets a second preset condition includes: An RSRP of the third message is greater than or equal to a second threshold.

Optionally, the first relay device may alternatively perform determining the transmission quality of the third message based on an SNR, an SINR, RSRQ, CSI, or the like of the third message.

With reference to the first aspect, in some implementations of the first aspect, the method further includes: The first relay device receives first indication information, where the first indication information indicates the first relay device to change the first preset condition and/or the second preset condition.

When no appropriate relay device is found after the first message is received for the first time, the indication information is received, and the preset condition is changed, so that a criterion can be changed based on an actual case, to select the appropriate relay device. This ensures normal service running.

With reference to the first aspect, in some implementations of the first aspect, the first message is for requesting to establish the first unicast connection.

With reference to the first aspect, in some implementations of the first aspect, the first message is for requesting to discover a target relay device.

With reference to the first aspect, in some implementations of the first aspect, the method further includes: The first relay device receives a fourth message sent by the first terminal device, where the fourth message is for requesting to establish the first unicast connection. The first relay device forwards the fourth message to the second terminal device, where the fourth message is for requesting to establish the first unicast connection. The first relay device receives a fifth message sent by the second terminal device, where the fifth message includes a unicast connection response message. The first relay device forwards the fifth message to the first terminal device.

Optionally, the first message may be only for requesting to discover the target relay device, or may be further for requesting to establish a unicast connection between the initiating UE and the target UE through the target relay device.

With reference to the first aspect, in some implementations of the first aspect, a unicast connection has been established between the first relay device and the second terminal device, and the method further includes: The first relay device receives a sixth message sent by the second terminal device, where the sixth message includes a service identifier of the second terminal device. The first relay device determines, based on the service identifier, to send the second message to the second terminal device.

The relay device may obtain, in advance through the previously established unicast connection channel, service information of interest to the target UE, to determine, based on the service information, whether to continue to send a message to the target UE. In addition, the previously established unicast connection channel may be reused, thereby improving efficiency of the unicast connection and saving resources.

With reference to the first aspect, in some implementations of the first aspect, that the first relay device sends a second message to the second terminal device further includes: The first relay device sends a second identifier of the first terminal device when sending the second message, where the second identifier is allocated by the first relay device to the first terminal device.

A local ID is allocated to the initiating UE, so that the target UE can distinguish between different initiating UEs when reusing a same unicast connection channel between the relay device and the different initiating UEs.

With reference to the first aspect, in some implementations of the first aspect, the method further includes: The first relay device receives a seventh message and the second identifier that are sent by the second terminal device, where the eighth message includes the first identifier of the first terminal device. Alternatively, the first relay device receives second indication information sent by the second terminal device, where the second indication information indicates the first relay device to release the second identifier of the first terminal device.

According to a second aspect, a unicast communication method is provided. The method includes: A first relay device receives a first message sent by a second terminal device, where the first message includes a service identifier of the second terminal device, and a unicast connection has been established between the first relay device and the second terminal device. The first relay device determines, based on the service identifier, to send a second message to the second terminal device, where the second message is for requesting to establish a first unicast connection, and the first unicast connection is a unicast connection established between a first terminal device and the second terminal device through the first relay device.

With reference to the second aspect, in some implementations of the second aspect, the method further includes: The first relay device receives a third message sent by the first terminal device, where the third message includes a first identifier of the second terminal device. The first relay device determines, when transmission quality of the third message meets a first preset condition, to send the second message to the second terminal device.

With reference to the second aspect, in some implementations of the second aspect, that transmission quality of the third message meets a first preset condition includes: A reference signal received power RSRP of the third message is greater than or equal to a first threshold.

With reference to the second aspect, in some implementations of the second aspect, that the first relay device sends the second message to the second terminal device further includes: The first relay device sends a second identifier of the first terminal device when sending the second message, where the second identifier is allocated by the first relay device to the first terminal device.

With reference to the second aspect, in some implementations of the second aspect, the method further includes: The first relay device receives a fourth message and the second identifier that are sent by the second terminal device, where the fourth message includes a first identifier of the first terminal device. Alternatively, the first relay device receives first indication information sent by the second terminal device, where the first indication information indicates the first relay device to release the second identifier of the first terminal device.

According to a third aspect, a unicast communication method is provided. The method includes: A first relay device receives a first message sent by a first terminal device, where the first message is for requesting to establish a second unicast connection, the second unicast connection is a unicast connection established between the first terminal device and a third terminal device through the first relay device, and a unicast connection has been established between the first relay device and the first terminal device. The first relay device sends, to the third terminal device, a second message and a corresponding service identifier for establishing the second unicast connection, where the second message is for requesting to establish the second unicast connection to the third terminal device.

Through the previously established unicast connection channel, the relay device may not need to perform filtering and determining the transmission quality of the received first message. In addition, an initiating UE may reuse, with a plurality of target UEs, the previously established unicast connection channel between the initiating UE and the relay device, to improve efficiency of the unicast connection and save resources.

With reference to the third aspect, in some implementations of the third aspect, that a first relay device receives a first message sent by a first terminal device further includes: The first relay device receives a third identifier of the third terminal device when receiving the first message, where the third identifier is allocated by the first terminal device to the third terminal device.

Because the initiating UE may reuse the previously established unicast connection channel between the initiating UE and the relay device to establish unicast connections to the plurality of target UEs, the initiating UE or the relay device allocates local identifiers to different target UEs, so that the initiating UE can distinguish between the different target UEs.

With reference to the third aspect, in some implementations of the third aspect, the method further includes: The first relay device receives a third message sent by the third terminal device, where the third message includes a response message for a second unicast connection request. The first relay device determines whether transmission quality of the third message meets a third preset condition.

The relay device performs determining of the transmission quality of the third message sent by a target UE, so that different cases that exist between the relay device and the target UE can be considered, and a relay device that is more appropriate for the target UE can be selected. This improves a success rate of the unicast connection and quality of unicast communication.

With reference to the third aspect, in some implementations of the third aspect, that transmission quality of the third message meets a third preset condition includes: An RSRP of the third message is greater than or equal to a third threshold.

Optionally, the first relay device may alternatively perform determining the transmission quality of the third message based on an SNR, an SINR, RSRQ, CSI, or the like of the third message.

With reference to the third aspect, in some implementations of the third aspect, when the transmission quality of the third message meets the third preset condition, the method further includes: The first relay device sends a fourth message and a fourth identifier of the third terminal device to the first terminal device, where the fourth message includes a first identifier of a second terminal device, and the fourth identifier is allocated by the first relay device to the third terminal device.

With reference to the third aspect, in some implementations of the third aspect, when the transmission quality of the third message does not meet the third preset condition, the method further includes: The first relay device sends third indication information to the first terminal device, where the third indication information indicates that the first relay device cannot be configured to establish the second unicast connection.

According to a fourth aspect, a unicast communication method is provided. The method includes: A second terminal device receives a first message sent by at least one candidate relay device, where the first message includes a first identifier of the second terminal device. The second terminal device sends, when transmission quality of the first message meets a first preset condition, a second message to at least one candidate relay device that meets the first preset condition, where the second message is for establishing a first unicast connection, the first unicast connection is a unicast connection established between a first terminal device and the second terminal device through a first relay device, and the first relay device is one of the at least one candidate relay device. Alternatively, when transmission quality of the first message does not meet a first preset condition, the second terminal device discards the first message or makes no response.

A target UE performs determining the transmission quality of the first message sent by the relay device, to consider different cases that exist between the target UE and the relay device, so that an appropriate relay device can be selected in a unicast connection process. This improves a success rate of the unicast connection and communication quality of unicast communication.

With reference to the fourth aspect, in some implementations of the third aspect, that transmission quality of the first message meets a first preset condition includes: A reference signal received power RSRP of the first message is greater than or equal to a first threshold.

Optionally, the target UE may alternatively perform determining the transmission quality of the first message based on an SNR, an SINR, RSRQ, CSI, or the like of the first message.

With reference to the fourth aspect, in some implementations of the fourth aspect, the first message further includes a transmission quality result of a third message, and the third message is sent by the first terminal device to the at least one candidate relay device. That transmission quality of the first message meets a first preset condition further includes: A reference signal received power RSRP of the third message is greater than or equal to a second threshold.

Optionally, the relay device may only measure but does not perform filtering on the transmission quality of the first message, and send a measurement result to the target UE, so that the target UE can perform comprehensive determining of the transmission quality of the first message and the second message, to select the appropriate relay device to establish the unicast connection. This helps improve the success rate of the unicast connection.

With reference to the fourth aspect, in some implementations of the fourth aspect, that the second terminal device sends, when transmission quality of the first message meets a first preset condition, a second message to at least one candidate relay device that meets the first preset condition further includes: The second terminal device selects the first relay device from the at least one candidate relay device based on a second preset condition. The second terminal device sends the second message to the first relay device.

Optionally, the target UE may select, from the plurality of candidate relay devices based on the preset condition, an optimal relay device that meets the condition or a plurality of relay devices that meet the condition.

With reference to the fourth aspect, in some implementations of the fourth aspect, the method further includes: The second terminal device receives first indication information, where the first indication information indicates the second terminal device to change the first preset condition and/or the second preset condition.

When no appropriate relay device is found after the first message is received for the first time, the indication information is received, and the preset condition is changed, so that a criterion can be changed based on an actual case, to select the appropriate relay device. This ensures normal service running.

With reference to the fourth aspect, in some implementations of the fourth aspect, the first message is for requesting to establish the first unicast connection.

With reference to the fourth aspect, in some implementations of the fourth aspect, the first message is for requesting to discover a target relay device.

Optionally, the first message may be only for requesting to discover the target relay device, or may be further for requesting to establish a unicast connection between an initiating UE and the target UE through the relay device.

With reference to the fourth aspect, in some implementations of the fourth aspect, the method further includes: The second terminal device receives a fourth message sent by the first relay device, where the fourth message is for requesting to establish the first unicast connection. The second terminal device sends a fifth message to the first relay device, where the fifth message includes a unicast connection response message.

With reference to the fourth aspect, in some implementations of the fourth aspect, a unicast connection has been established between the second terminal device and the at least one candidate relay device, and the method further includes: The second terminal device sends a sixth message to the at least one candidate relay device, where the sixth message includes a service identifier of the second terminal device.

The target UE may send, to the relay device in advance through the previously established unicast connection channel, service information of interest to the target UE, so that the relay device can determine, based on the service information, whether to continue to send a message to the target UE. In addition, the previously established unicast connection channel may be reused, thereby improving efficiency of the unicast connection and saving resources.

With reference to the fourth aspect, in some implementations of the fourth aspect, that a second terminal device receives a first message sent by at least one candidate relay device further includes: The second terminal device receives a second identifier of the first terminal device when receiving the first message, where the second identifier is allocated by the at least one candidate relay device to the first terminal device.

A local ID allocated by the relay device to the initiating UE is received, so that the target UE can distinguish between different initiating UEs when reusing a same unicast connection channel between the relay device and the target UE.

With reference to the fourth aspect, in some implementations of the fourth aspect, that the second terminal device sends a second message to at least one candidate relay device that meets the first preset condition further includes: The second terminal device sends a second identifier of the second terminal device when sending the second message.

Optionally, when the transmission quality of the first message meets the first preset condition, the second terminal device may send second indication information to the at least one candidate relay device that meets the first preset condition, where the second indication information indicates the at least one candidate relay device to release a second identifier, the second identifier is allocated by the first relay device to the first terminal device, and unicast communication needs to be performed between the first terminal device and the second terminal device.

According to a fifth aspect, a unicast communication method is provided. The method includes: A second terminal device sends a first message to at least one candidate relay device, where the first message includes a service identifier of the second terminal device, and a unicast connection has been established between the second terminal device and the at least one candidate relay device.

With reference to the fifth aspect, in some implementations of the fifth aspect, the method further includes: The second terminal device receives a second message sent by the at least one candidate relay device, where the second message is for requesting to establish a first unicast connection, the first unicast connection is a unicast connection established between a first terminal device and the second terminal device through a first relay device, and the first relay device is one of the at least one candidate relay device. The second terminal device sends a third message to the at least one candidate relay device. Alternatively, when transmission quality of the second message meets a first preset condition, the second terminal device sends a third message to at least one candidate relay device that meets the first preset condition, where the third message includes a unicast connection response message. Alternatively, when transmission quality of the second message does not meet a first preset condition, the second terminal device discards the second message or makes no response.

With reference to the fifth aspect, in some implementations of the fifth aspect, that transmission quality of the second message meets a first preset condition includes: A reference signal received power RSRP of the second message is greater than or equal to a first threshold.

With reference to the fifth aspect, in some implementations of the fifth aspect, the second message further includes a transmission quality result of a fourth message, and the fourth message is sent by the first terminal device to the at least one candidate relay device. That transmission quality of the second message meets a first preset condition further includes: A reference signal received power RSRP of the fourth message is greater than or equal to a second threshold.

With reference to the fifth aspect, in some implementations of the fifth aspect, that the second terminal device sends, when transmission quality of the second message meets a first preset condition, a third message to at least one candidate relay device that meets the first preset condition further includes: The second terminal device selects the first relay device from the at least one candidate relay device based on a second preset condition. The second terminal device sends the third message to the first relay device.

With reference to the fifth aspect, in some implementations of the fifth aspect, the method further includes: The second terminal device receives first indication information, where the first indication information indicates the second terminal device to change the first preset condition and/or the second preset condition.

With reference to the fifth aspect, in some implementations of the fifth aspect, that the second terminal device receives a second message sent by the at least one candidate relay device further includes: The second terminal device receives a second identifier of the first terminal device when receiving the second message, where the second identifier is allocated by the at least one candidate relay device to the first terminal device.

With reference to the fifth aspect, in some implementations of the fifth aspect, that the second terminal device sends a third message to the at least one candidate relay device further includes: The second terminal device sends a second identifier of the first terminal device when sending the third message.

Optionally, the second terminal device may further send second indication information to the at least one candidate relay device, where the second indication information indicates the at least one candidate relay device to release the second identifier.

According to a sixth aspect, a unicast communication method is provided. The method includes: A first terminal device sends a first message to at least one candidate relay device, where the first message includes a first identifier of a second terminal device. The first terminal device receives a second message sent by the at least one candidate relay device, where the second message includes the first identifier of the second terminal device. The first terminal device sends a third message to a first relay device when transmission quality of the second message meets a first preset condition, where the third message is for establishing a first unicast connection, the first unicast connection is a unicast connection established between the first terminal device and the second terminal device through the first relay device, and the first relay device is one of the at least one candidate relay device.

An initiating UE performs determining the transmission quality of the received second message, so that different cases that exist between the initiating UE and the relay device can be considered, to select an appropriate relay device in a unicast connection process. This improves a success rate of the unicast connection and communication quality of unicast communication.

With reference to the sixth aspect, in some implementations of the sixth aspect, that transmission quality of the second message meets a first preset condition includes: A reference signal received power RSRP of the second message is greater than or equal to a first threshold.

Optionally, the initiating UE may alternatively perform determining the transmission quality of the second message based on an SNR, an SINR, RSRQ, CSI, or the like of the second message.

With reference to the sixth aspect, in some implementations of the sixth aspect, the first message is for requesting to establish the first unicast connection, the third message includes first indication information, and the first indication message indicates the second terminal device to establish the first unicast connection to the first terminal device through the first relay device.

With reference to the sixth aspect, in some implementations of the sixth aspect, the first message is for requesting to discover a target relay device, and the third message is for requesting to establish the first unicast connection to the second terminal device through the first relay device.

Optionally, the first message may be only for discovering the target relay device, or may be further for requesting to establish a unicast connection between the initiating UE and a target UE through the relay device.

According to a seventh aspect, a unicast communication method is provided. The method includes: A first terminal device sends a first message to at least one candidate relay device, where the first message is for requesting to establish a second unicast connection, the first message includes information about a corresponding service identifier for establishing the second unicast connection, a unicast connection has been established between the at least one candidate relay device and the first terminal device, the second unicast connection is a unicast connection established between the first terminal device and a third terminal device through a first relay device, and the first relay device is one of the at least one candidate relay device.

Through the previously established unicast connection channel, an initiating UE may reuse, with a plurality of target UEs, the previously established unicast connection channel between the initiating UE and the relay device, to improve efficiency of the unicast connection and save resources.

With reference to the seventh aspect, in some implementations of the seventh aspect, the method further includes: The first terminal device receives a second message and a second identifier of a second terminal device that are sent by the first relay device, or receives second indication information sent by the first relay device, where the second identifier of the second terminal device is allocated by the first relay device or the first terminal device to the second terminal device, and the second indication information indicates that the first relay device cannot be configured to establish the unicast connection.

Because the initiating UE may reuse the previously established unicast connection channel between the initiating UE and the relay device to establish unicast connections to the plurality of target UEs, the initiating UE can distinguish between different target UEs based on local identifiers allocated by the initiating UE or the relay device to the different target UEs.

With reference to the seventh aspect, in some implementations of the seventh aspect, that a first terminal device sends a first message to at least one candidate relay device further includes: The first terminal device sends a third identifier of the third terminal device when sending the first message, where the third identifier is allocated by the first terminal device to the third terminal device.

Because the initiating UE may reuse the previously established unicast connection channel between the initiating UE and the relay device to establish the unicast connections to the plurality of target UEs, the initiating UE may allocate the local identifiers to the different target UEs, so that the initiating UE can distinguish between the different target UEs.

With reference to the seventh aspect, in some implementations of the seventh aspect, the method further includes: The first terminal device sends second indication information, where the second indication information indicates the first relay device and the second terminal device to change a preset condition.

When no appropriate relay device is found after the first message is sent for the first time, the indication information is sent to change the preset condition, so that a criterion can be changed based on an actual case, to select an appropriate relay device. This ensures normal service running.

According to an eighth aspect, a unicast communication apparatus is provided. The apparatus includes: a first receiving module, configured to receive a first message sent by a first terminal device, where the first message includes a first identifier of a second terminal device; a first processing module, configured to determine that transmission quality of the first message meets a first preset condition; and a first sending module, configured to send, by a first relay device, a second message to the second terminal device when the transmission quality of the first message meets the first preset condition, where the second message is for establishing a first unicast connection, and the first unicast connection is a unicast connection established between the first terminal device and the second terminal device through the first relay device.

With reference to the eighth aspect, in some implementations of the eighth aspect, the first processing module is specifically configured to determine that a reference signal received power RSRP of the first message is greater than or equal to a first threshold.

With reference to the eighth aspect, in some implementations of the eighth aspect, the first receiving module is further configured to receive a third message sent by the second terminal device, where the third message includes the first identifier of the second terminal device. The first processing module is further configured to determine that transmission quality of the third message meets a second preset condition. The first sending module is further configured to forward the third message to the first terminal device when the transmission quality of the third message meets the second preset condition.

With reference to the eighth aspect, in some implementations of the eighth aspect, the first processing module is specifically configured to determine that an RSRP of the third message is greater than or equal to a second threshold.

With reference to the eighth aspect, in some implementations of the eighth aspect, the first receiving module is further configured to receive first indication information, where the first indication information indicates the apparatus to change the first preset condition and/or the second preset condition.

With reference to the eighth aspect, in some implementations of the eighth aspect, the first message is for requesting to establish the first unicast connection.

With reference to the eighth aspect, in some implementations of the eighth aspect, the first message is for requesting to discover a target relay device.

With reference to the eighth aspect, in some implementations of the eighth aspect, the first receiving module is further configured to receive a fourth message sent by the first terminal device, where the fourth message is for requesting to establish the first unicast connection. The first sending module is further configured to forward the fourth message to the second terminal device. The first receiving module is further configured to receive a fifth message sent by the second terminal device, where the fifth message includes a unicast connection response message. The first sending module is further configured to forward the fifth message to the first terminal device.

With reference to the eighth aspect, in some implementations of the eighth aspect, a unicast connection has been established between the first relay device and the second terminal device. The first receiving module is further configured to receive a sixth message sent by the second terminal device, where the sixth message includes a service identifier of the second terminal device. The first processing module is further configured to determine, based on the service identifier, to send the second message to the second terminal device.

With reference to the eighth aspect, in some implementations of the eighth aspect, a second sending module is further configured to send a second identifier of the first terminal device when sending the second message, where the second identifier is allocated by the apparatus to the first terminal device.

With reference to the eighth aspect, in some implementations of the eighth aspect, the first receiving module is further configured to: receive a seventh message and the second identifier that are sent by the second terminal device, where the seventh message includes the first identifier of the second terminal device; or receive second indication information sent by the second terminal device, where the second indication information indicates the apparatus to release the second identifier of the first terminal device.

According to a ninth aspect, a unicast communication apparatus is provided. The apparatus includes: a sixth receiving module, configured to receive a first message sent by a second terminal device, where the first message includes a service identifier of the second terminal device, and a unicast connection has been established between a first relay device and the second terminal device; and a sixth sending module, configured to determine, based on the service identifier, to send a second message to the second terminal device, where the second message is for requesting to establish a first unicast connection, and the first unicast connection is a unicast connection established between a first terminal device and the second terminal device through the first relay device.

With reference to the ninth aspect, in some implementations of the ninth aspect, the sixth receiving module is further configured to receive a third message sent by the first terminal device, where the third message includes a first identifier of the second terminal device. The apparatus further includes a sixth processing module, configured to determine that transmission quality of the third message meets a first preset condition. The sixth sending module is further configured to determine, by the first relay device when the transmission quality of the third message meets the first preset condition, to send the second message to the second terminal device.

With reference to the ninth aspect, in some implementations of the ninth aspect, the sixth processing module is specifically configured to determine that a reference signal received power RSRP of the third message is greater than or equal to a first threshold.

With reference to the ninth aspect, in some implementations of the ninth aspect, the sixth sending module is further configured to send a second identifier of the first terminal device when sending the second message, where the second identifier is allocated by the apparatus to the first terminal device.

With reference to the ninth aspect, in some implementations of the ninth aspect, the sixth receiving module is further configured to: receive a fourth message and the second identifier that are sent by the second terminal device, where the fourth message includes a first identifier of the first terminal device; or receive first indication information sent by the second terminal device, where the first indication information indicates the apparatus to release the second identifier of the first terminal device.

According to a tenth aspect, a unicast communication apparatus is provided. The apparatus includes: a second receiving module, configured to receive a first message sent by a first terminal device, where the first message is for requesting to establish a second unicast connection, the second unicast connection is a unicast connection established between the first terminal device and a third terminal device through the apparatus, and a unicast connection has been established between the apparatus and the first terminal device; and a second sending module, configured to send, to the third terminal device, a second message and a corresponding service identifier for establishing the second unicast connection, where the second message is for requesting to establish the second unicast connection to the third terminal device.

With reference to the tenth aspect, in some implementations of the tenth aspect, the second receiving module is specifically configured to receive a third identifier of the third terminal device when receiving the first message, where the third identifier is allocated by the first terminal device to the third terminal device.

With reference to the tenth aspect, in some implementations of the tenth aspect, the second receiving module is further configured to receive a third message sent by the third terminal device, where the third message includes a response message for a second unicast connection request. The apparatus further includes a second processing module, configured to determine whether transmission quality of the third message meets a third preset condition.

With reference to the tenth aspect, in some implementations of the tenth aspect, the second processing module is specifically configured to determine that an RSRP of the third message is greater than or equal to a third threshold.

With reference to the tenth aspect, in some implementations of the tenth aspect, the second sending module is further configured to send a fourth message and a fourth identifier of the third terminal device to the first terminal device, where the fourth message includes a first identifier of a second terminal device, and the fourth identifier is allocated by the first relay device to the third terminal device.

With reference to the tenth aspect, in some implementations of the tenth aspect, the second sending module is further configured to send third indication information to the first terminal device, where the third indication information indicates that the apparatus cannot be configured to establish the second unicast connection.

According to an eleventh aspect, a unicast communication apparatus is provided. The apparatus includes: a third receiving module, configured to receive a first message sent by at least one candidate relay device, where the first message includes a first identifier of the apparatus; a third processing module, configured to determine whether transmission quality of the first message meets a first preset condition; and a third sending module, configured to: when the transmission quality of the first message meets the first preset condition, send a second message to at least one candidate relay device that meets the first preset condition, where the second message is for establishing a first unicast connection, the first unicast connection is a unicast connection established between a first terminal device and the apparatus through a first relay device, and the first relay device is one of the at least one candidate relay device; or when the transmission quality of the first message does not meet the first preset condition, discard the first message or make no response.

With reference to the eleventh aspect, in some implementations of the eleventh aspect, the third processing module is specifically configured to determine that a reference signal received power RSRP of the first message is greater than or equal to a first threshold.

With reference to the eleventh aspect, in some implementations of the eleventh aspect, the first message further includes a transmission quality result of a third message, and the third message is sent by the first terminal device to the at least one candidate relay device. The third processing module is further configured to determine that a reference signal received power RSRP of the third message is greater than or equal to a second threshold.

With reference to the eleventh aspect, in some implementations of the eleventh aspect, the third processing module is further configured to select the first relay device from the at least one candidate relay device based on a second preset condition. The third sending module is further configured to send the second message to the first relay device.

With reference to the eleventh aspect, in some implementations of the eleventh aspect, the third receiving module is further configured to receive first indication information, where the first indication information indicates the apparatus to change the first preset condition and/or the second preset condition.

With reference to the eleventh aspect, in some implementations of the eleventh aspect, the first message is for requesting to establish the first unicast connection.

With reference to the eleventh aspect, in some implementations of the eleventh aspect, the first message is for requesting to discover a target relay device.

With reference to the eleventh aspect, in some implementations of the eleventh aspect, the third receiving module is further configured to receive a fourth message sent by the first relay device, where the fourth message is for requesting to establish the first unicast connection. The third sending module is further configured to send a fifth message to the first relay device, where the fifth message includes a unicast connection response message.

With reference to the eleventh aspect, in some implementations of the eleventh aspect, a unicast connection has been established between the second terminal device and the at least one candidate relay device. The third sending module is further configured to send a sixth message to the at least one candidate relay device, where the sixth message includes a service identifier of the apparatus.

With reference to the eleventh aspect, in some implementations of the eleventh aspect, the third receiving module is further configured to receive a second identifier of the first terminal device when receiving the first message, where the second identifier is allocated by the at least one candidate relay device to the first terminal device.

With reference to the eleventh aspect, in some implementations of the eleventh aspect, the third sending module is further configured to send a second identifier of the first terminal device when sending the second message.

According to a twelfth aspect, a unicast communication apparatus is provided. The apparatus includes: a seventh processing module, configured to generate a first message, where the first message includes a service identifier of the apparatus; and a seventh sending module, configured to send the first message to at least one candidate relay device, where a unicast connection has been established between the apparatus and the at least one candidate relay device.

With reference to the twelfth aspect, in some implementations of the twelfth aspect, the apparatus further includes a seventh receiving module, configured to receive a second message sent by the at least one candidate relay device, where the second message is for requesting to establish a first unicast connection, the first unicast connection is a unicast connection established between a first terminal device and the apparatus through a first relay device, and the first relay device is one of the at least one candidate relay device. The seventh sending module is further configured to send a third message to the at least one candidate relay device. Alternatively, the seventh processing module is further configured to determine whether transmission quality of the second message meets a first preset condition. When the transmission quality of the second message meets the first preset condition, the seventh sending module is further configured to send a third message to at least one candidate relay device that meets the first preset condition, where the third message includes a unicast connection response message. Alternatively, when the transmission quality of the second message does not meet the first preset condition, the apparatus discards the second message or makes no response.

With reference to the twelfth aspect, in some implementations of the twelfth aspect, the seventh processing module is specifically configured to determine that a reference signal received power RSRP of the second message is greater than or equal to a first threshold.

With reference to the twelfth aspect, in some implementations of the twelfth aspect, the second message further includes a transmission quality result of a fourth message, and the fourth message is sent by the first terminal device to the at least one candidate relay device. The seventh processing module is further configured to determine that a reference signal received power RSRP of the fourth message is greater than or equal to a second threshold.

With reference to the twelfth aspect, in some implementations of the twelfth aspect, the seventh processing module is further configured to select the first relay device from the at least one candidate relay device based on a second preset condition. The seventh sending module is further configured to send the third message to the first relay device.

With reference to the twelfth aspect, in some implementations of the twelfth aspect, the seventh receiving module is further configured to receive first indication information, where the first indication information indicates the apparatus to change the first preset condition and/or the second preset condition.

With reference to the twelfth aspect, in some implementations of the twelfth aspect, the seventh receiving module is further configured to receive a second identifier of the first terminal device when receiving the second message, where the second identifier is allocated by the at least one candidate relay device to the first terminal device.

With reference to the twelfth aspect, in some implementations of the twelfth aspect, the seventh sending module is further configured to send a second identifier of the first terminal device when sending the third message.

Optionally, the seventh sending module may be further configured to send second indication information to the at least one candidate relay device, where the second indication information indicates the at least one candidate relay device to release the second identifier.

According to a thirteenth aspect, a unicast communication apparatus is provided. The apparatus includes: a fourth sending module, configured to send a first message to at least one candidate relay device, where the first message includes a first identifier of a second terminal device; a fourth receiving module, configured to receive a second message sent by the at least one candidate relay device, where the second message includes the first identifier of the second terminal device; and a fourth processing module, configured to determine that transmission quality of the second message meets a first preset condition. The fourth sending module is further configured to send a third message to a first relay device when the transmission quality of the second message meets the first preset condition, where the third message is for establishing a first unicast connection, the first unicast connection is a unicast connection established between the apparatus and the second terminal device through the first relay device, and the first relay device is one of the at least one candidate relay device.

With reference to the thirteenth aspect, in some implementations of the thirteenth aspect, the fourth processing module is specifically configured to determine that a reference signal received power RSRP of the second message is greater than or equal to a first threshold.

With reference to the thirteenth aspect, in some implementations of the thirteenth aspect, the first message is for requesting to establish the first unicast connection, the third message includes first indication information, and the first indication message indicates the second terminal device to establish the first unicast connection to the apparatus through the first relay device.

With reference to the thirteenth aspect, in some implementations of the thirteenth aspect, the first message is for requesting to discover a target relay device, and the third message is for requesting to establish the first unicast connection to the second terminal device through the first relay device.

According to a fourteenth aspect, a unicast communication apparatus is provided. The apparatus includes: a fifth processing module, configured to generate a first message, where the first message is for requesting to establish a second unicast connection, the first message includes information about a corresponding service identifier for establishing the second unicast connection, a unicast connection has been established between the apparatus and at least one candidate relay device, the second unicast connection is a unicast connection established between the apparatus and a third terminal device through a first relay device, and the first relay device is one of the at least one candidate relay device; and a fifth sending module, configured to send the first message to the at least one candidate relay device.

With reference to the fourteenth aspect, in some implementations of the fourteenth aspect, the apparatus further includes a fifth receiving module, configured to: receive a second message and a second identifier of a second terminal device that are sent by the first relay device, or receive second indication information sent by the first relay device, where the second identifier of the second terminal device is allocated by the first relay device or the apparatus to the second terminal device, and the second indication information indicates that the first relay device cannot be configured to establish the unicast connection.

With reference to the fourteenth aspect, in some implementations of the fourteenth aspect, the fifth sending module is further configured to send a third identifier of the third terminal device when sending the first message, where the third identifier is allocated by the apparatus to the third terminal device.

With reference to the fourteenth aspect, in some implementations of the fourteenth aspect, the fifth sending module is further configured to send second indication information, where the second indication information indicates the first relay device and the second terminal device to change a preset condition.

According to a fifteenth aspect, a communication apparatus is provided. The communication apparatus has a function of implementing the method according to the first aspect. The function may be implemented by hardware, or may be implemented by hardware executing corresponding software. The hardware or the software includes one or more modules corresponding to the foregoing function.

According to a sixteenth aspect, a communication apparatus is provided. The communication apparatus has a function of implementing the method according to the second aspect. The function may be implemented by hardware, or may be implemented by hardware executing corresponding software. The hardware or the software includes one or more modules corresponding to the foregoing function.

According to a seventeenth aspect, a communication apparatus is provided. The communication apparatus has a function of implementing the method according to the third aspect. The function may be implemented by hardware, or may be implemented by hardware executing corresponding software. The hardware or the software includes one or more modules corresponding to the foregoing function.

According to an eighteenth aspect, a communication apparatus is provided. The communication apparatus has a function of implementing the method according to the fourth aspect. The function may be implemented by hardware, or may be implemented by hardware executing corresponding software. The hardware or the software includes one or more modules corresponding to the foregoing function.

According to a nineteenth aspect, a communication apparatus is provided. The communication apparatus has a function of implementing the method according to the fifth aspect. The function may be implemented by hardware, or may be implemented by hardware executing corresponding software. The hardware or the software includes one or more modules corresponding to the foregoing function.

According to a twentieth aspect, a communication apparatus is provided. The communication apparatus has a function of implementing the method according to the sixth aspect. The function may be implemented by hardware, or may be implemented by hardware executing corresponding software. The hardware or the software includes one or more modules corresponding to the foregoing function.

According to a twenty-first aspect, a communication apparatus is provided. The communication apparatus has a function of implementing the method according to the seventh aspect. The function may be implemented by hardware, or may be implemented by hardware executing corresponding software. The hardware or the software includes one or more modules corresponding to the foregoing function.

According to a twenty-second aspect, a communication apparatus is provided. The communication apparatus includes a processor and a memory. The memory is configured to store a computer program, and the processor is configured to invoke the computer program from the memory and run the computer program, so that the communication device performs the method according to the first aspect and the possible implementations of the first aspect.

According to a twenty-third aspect, a communication apparatus is provided. The communication apparatus includes a processor and a memory. The memory is configured to store a computer program, and the processor is configured to invoke the computer program from the memory and run the computer program, so that the communication device performs the method according to the second aspect and the possible implementations of the second aspect.

According to a twenty-fourth aspect, a communication apparatus is provided. The communication apparatus includes a processor and a memory. The memory is configured to store a computer program, and the processor is configured to invoke the computer program from the memory and run the computer program, so that the communication device performs the method according to the third aspect and the possible implementations of the third aspect.

According to a twenty-fifth aspect, a communication apparatus is provided. The communication apparatus includes a processor and a memory. The memory is configured to store a computer program, and the processor is configured to invoke the computer program from the memory and run the computer program, so that the communication device performs the method according to the fourth aspect and the possible implementations of the fourth aspect.

According to a twenty-sixth aspect, a communication apparatus is provided. The communication apparatus includes a processor and a memory. The memory is configured to store a computer program, and the processor is configured to invoke the computer program from the memory and run the computer program, so that the communication device performs the method according to the fifth aspect and the possible implementations of the fifth aspect.

According to a twenty-seventh aspect, a communication apparatus is provided. The communication apparatus includes a processor and a memory. The memory is configured to store a computer program, and the processor is configured to invoke the computer program from the memory and run the computer program, so that the communication device performs the method according to the sixth aspect and the possible implementations of the sixth aspect.

According to a twenty-eighth aspect, a communication apparatus is provided. The communication apparatus includes a processor and a memory. The memory is configured to store a computer program, and the processor is configured to invoke the computer program from the memory and run the computer program, so that the communication device performs the method according to the seventh aspect and the possible implementations of the seventh aspect.

According to a twenty-ninth aspect, an apparatus (where for example, the apparatus may be a chip system) is provided. The apparatus includes a processor, configured to support the communication apparatus in implementing the functions in the first aspect. In a possible design, the apparatus further includes a memory, and the memory is configured to store program instructions and data necessary for the communication apparatus. When the apparatus is the chip system, the apparatus may include a chip, or may include a chip and another discrete component.

According to a thirtieth aspect, an apparatus (where for example, the apparatus may be a chip system) is provided. The apparatus includes a processor, configured to support the communication apparatus in implementing the functions in the second aspect. In a possible design, the apparatus further includes a memory, and the memory is configured to store program instructions and data necessary for the communication apparatus. When the apparatus is the chip system, the apparatus may include a chip, or may include a chip and another discrete component.

According to a thirty-first aspect, an apparatus (where for example, the apparatus may be a chip system) is provided. The apparatus includes a processor, configured to support the communication apparatus in implementing the functions in the third aspect. In a possible design, the apparatus further includes a memory, and the memory is configured to store program instructions and data necessary for the communication apparatus. When the apparatus is the chip system, the apparatus may include a chip, or may include a chip and another discrete component.

According to a thirty-second aspect, an apparatus (where for example, the apparatus may be a chip system) is provided. The apparatus includes a processor, configured to support the communication apparatus in implementing the functions in the fourth aspect. In a possible design, the apparatus further includes a memory, and the memory is configured to store program instructions and data necessary for the communication apparatus. When the apparatus is the chip system, the apparatus may include a chip, or may include a chip and another discrete component.

According to a thirty-third aspect, an apparatus (where for example, the apparatus may be a chip system) is provided. The apparatus includes a processor, configured to support the communication apparatus in implementing the functions in the fifth aspect. In a possible design, the apparatus further includes a memory, and the memory is configured to store program instructions and data necessary for the communication apparatus. When the apparatus is the chip system, the apparatus may include a chip, or may include a chip and another discrete component.

According to a thirty-fourth aspect, an apparatus (where for example, the apparatus may be a chip system) is provided. The apparatus includes a processor, configured to support the communication apparatus in implementing the functions in the sixth aspect. In a possible design, the apparatus further includes a memory, and the memory is configured to store program instructions and data necessary for the communication apparatus. When the apparatus is the chip system, the apparatus may include a chip, or may include a chip and another discrete component.

According to a thirty-fifth aspect, an apparatus (where for example, the apparatus may be a chip system) is provided. The apparatus includes a processor, configured to support the communication apparatus in implementing the functions in the seventh aspect. In a possible design, the apparatus further includes a memory, and the memory is configured to store program instructions and data necessary for the communication apparatus. When the apparatus is the chip system, the apparatus may include a chip, or may include a chip and another discrete component.

According to a thirty-sixth aspect, a computer-readable storage medium is provided. The computer-readable storage medium is configured to store a computer program. The computer program includes instructions for performing the method according to any one of the first aspect or the possible implementations of the first aspect.

According to a thirty-seventh aspect, a computer-readable storage medium is provided. The computer-readable storage medium is configured to store a computer program. The computer program includes instructions for performing the method according to any one of the second aspect or the possible implementations of the second aspect.

According to a thirty-eighth aspect, a computer-readable storage medium is provided. The computer-readable storage medium is configured to store a computer program. The computer program includes instructions for performing the method according to any one of the fourth aspect or the possible implementations of the fourth aspect.

According to a thirty-ninth aspect, a computer-readable storage medium is provided. The computer-readable storage medium is configured to store a computer program. The computer program includes instructions for performing the method according to any one of the first aspect or the possible implementations of the first aspect.

According to a fortieth aspect, a computer-readable storage medium is provided. The computer-readable storage medium is configured to store a computer program. The computer program includes instructions for performing the method according to any one of the fifth aspect or the possible implementations of the fifth aspect.

According to a forty-first aspect, a computer-readable storage medium is provided. The computer-readable storage medium is configured to store a computer program. The computer program includes instructions for performing the method according to any one of the sixth aspect or the possible implementations of the sixth aspect.

According to a forty-second aspect, a computer-readable storage medium is provided. The computer-readable storage medium is configured to store a computer program. The computer program includes instructions for performing the method according to any one of the seventh aspect or the possible implementations of the seventh aspect.

According to a forty-third aspect, a computer program product is provided. The computer program product includes a computer program. When the computer program is run on a computer device, the computer device is enabled to perform the method according to the first aspect.

According to a forty-fourth aspect, a computer program product is provided. The computer program product includes a computer program. When the computer program is run on a computer device, the computer device is enabled to perform the method according to the second aspect.

According to a forty-fifth aspect, a computer program product is provided. The computer program product includes a computer program. When the computer program is run on a computer device, the computer device is enabled to perform the method according to the third aspect.

According to a forty-sixth aspect, a computer program product is provided. The computer program product includes a computer program. When the computer program is run on a computer device, the computer device is enabled to perform the method according to the fourth aspect.

According to a forty-seventh aspect, a computer program product is provided. The computer program product includes a computer program. When the computer program is run on a computer device, the computer device is enabled to perform the method according to the fifth aspect.

According to a forty-eighth aspect, a computer program product is provided. The computer program product includes a computer program. When the computer program is run on a computer device, the computer device is enabled to perform the method according to the sixth aspect.

According to a forty-ninth aspect, a computer program product is provided. The computer program product includes a computer program. When the computer program is run on a computer device, the computer device is enabled to perform the method according to the seventh aspect.

According to a fiftieth aspect, a communication system is provided. The communication system includes a first terminal device, a second terminal device, at least one candidate relay device, and a first relay device. The first relay device is configured to perform a step performed by the first relay device in the first aspect, the second aspect, and/or the third aspect or in the solutions provided in embodiments of this application. The second terminal device is configured to perform a step performed by the second terminal device in the fourth aspect and/or the fifth aspect or in the solutions provided in embodiments of this application. The first terminal device is configured to perform a step performed by the first terminal device in the sixth aspect and/or the seventh aspect or in the solutions provided in embodiments of this application. Optionally, the communication system further includes a third terminal device, where the third network device is configured to perform a step performed by the third terminal device in the third aspect and/or the seventh aspect or in the solutions provided in embodiments of this application.

These aspects or other aspects of this application are clearer and more comprehensible in descriptions of the following embodiments.

BRIEF DESCRIPTION OF DRAWINGS

FIG. 7 is a schematic diagram of another unicast communication method according to an embodiment of this application;

FIG. 8 is a schematic diagram of another unicast communication method according to an embodiment of this application;

FIG. 9 is a schematic diagram of another unicast communication method according to an embodiment of this application;

FIG. 10 is a schematic diagram of another unicast communication method according to an embodiment of this application.

FIG. 11 is a schematic diagram of another unicast communication method according to an embodiment of this application;

FIG. 12 is a schematic diagram of another unicast communication method according to an embodiment of this application;

DESCRIPTION OF EMBODIMENTS

Figure 1:
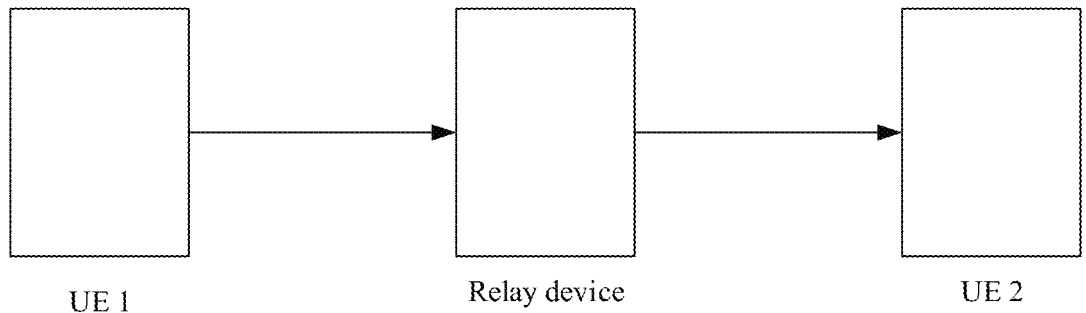
FIG. 1 is a schematic diagram of a system architecture according to an embodiment of this application.

The following describes technical solutions in this application with reference to the accompanying drawings.

The technical solutions in embodiments of this application may be applied to various communication systems, such as a global system for mobile communications (GSM) system, a code division multiple access (CDMA) system, a wideband code division multiple access (WCDMA) system, a general packet radio service (GPRS) system, a long term evolution (LTE) system, an LTE frequency division duplex (FDD) system, an LTE time division duplex (TDD) system, a universal mobile telecommunications system (UMTS), a worldwide interoperability for microwave access (WiMAX) communication system, a 5th generation (5G) system or a new radio (NR) system, and a future evolved communication system.

A terminal device in embodiments of this application may be user equipment, an access terminal, a subscriber unit, a subscriber station, a mobile station, a remote station, a remote terminal, a mobile device, a user terminal, a terminal, a wireless communication device, a user agent, or a user apparatus. The terminal device may alternatively be a cellular phone, a cordless phone, a session initiation protocol (SIP) phone, a wireless local loop (WLL) station, a personal digital assistant (PDA), a handheld device having a wireless communication function, a computing device, another processing device connected to a wireless modem, a vehicle-mounted device, a wearable device, a terminal device in a future 5G network, a terminal device in a future evolved public land mobile network (PLMN), or the like. This is not limited in embodiments of this application.

A network device in embodiments of this application may be a device configured to communicate with the terminal device. The network device may be a base transceiver station (BTS) in the global system for mobile communications (GSM) system or the code division multiple access (CDMA) system, may be a NodeB (NB) in the wideband code division multiple access (WCDMA) system, may be an evolved NodeB (eNB or eNodeB) in the LTE system, or may be a radio controller in a cloud radio access network (CRAN) scenario. Alternatively, the network device may be a relay station, an access point, a vehicle-mounted device, a wearable device, a network device in the 5G network, a network device in the future evolved PLMN, or the like. This is not limited in embodiments of this application.

In a wireless communication system, data communication may be performed between UEs via a network, or communication between UEs may be directly performed not through a network device. An interface between the UEs is referred to as a PC5 interface, similar to a Uu interface between a UE and a base station. A link between the UEs is referred to as a sidelink (SL). A typical application scenario of sidelink communication is vehicle-to-everything (V2X). In the vehicle-to-everything, each vehicle is one UE, and data transmission may be directly performed between UEs through a sidelink but not via a network. In this way, a communication delay can be effectively reduced.

The sidelink can support unicast communication. The unicast communication is similar to data communication performed after a radio resource control (RRC) connection is established between a UE and a base station, and a unicast connection needs to be first established between the two UEs. After the unicast connection is established, the two UEs may perform data communication based on a negotiated identifier, where data may or may not be encrypted. Compared with broadcast communication, the unicast communication can be performed only between two UEs between which a unicast connection has been established.

Figure 2:
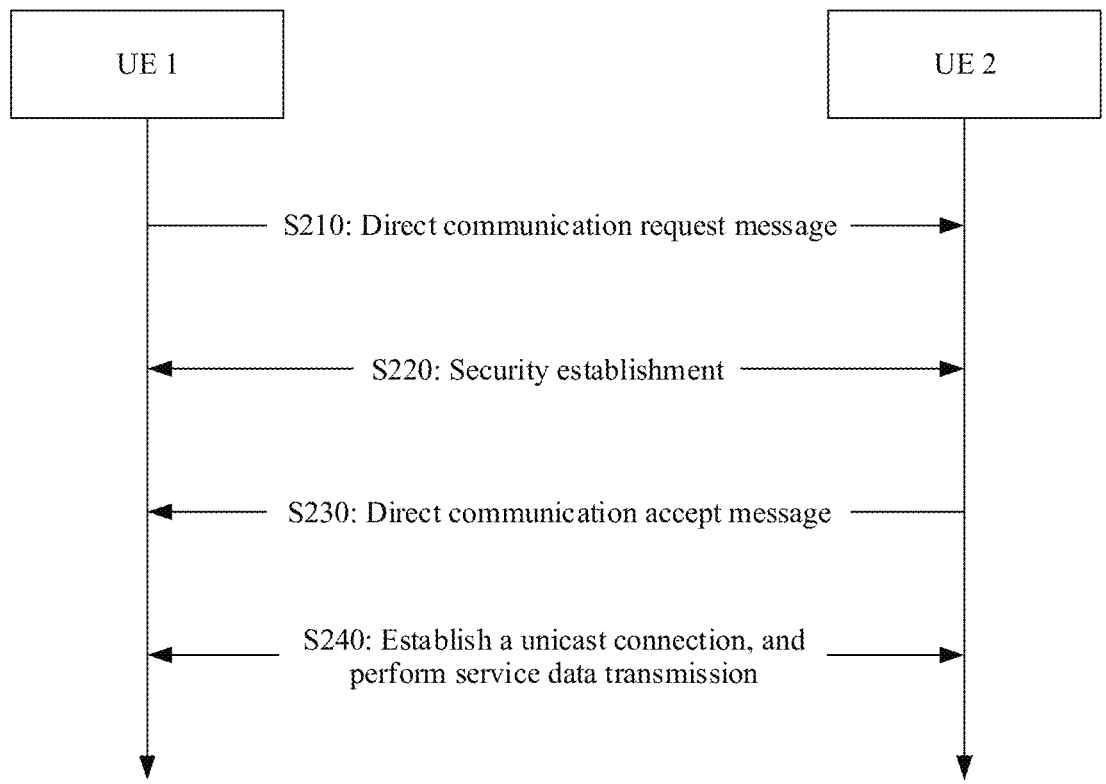
FIG. 2 is a schematic flowchart of a unicast connection.

FIG. 2 is a schematic flowchart of establishing a unicast connection between two UEs in a conventional technology. S210: A UE 1 sends a direct communication request message to a UE 2. Optionally, the UE 1 may send the request message in a broadcast manner. S220: The UE 1 and the UE 2 establish a security connection therebetween. S230: The UE 2 sends a direct communication accept message to the UE 1. S240: The UE 1 and the UE 2 establish a unicast connection therebetween, and perform service data transmission through the unicast connection.

When the UEs communicate with each other through a sidelink, a communication distance is not very long due to factors such as an insufficient hardware capability of a transmit-side UE. This limits a scenario in which the UEs communicate with each other through the sidelink. To resolve this problem, a UE-to-UE relay architecture is introduced into discussions in a standard. FIG. 1 is a schematic diagram of a system architecture according to an embodiment of this application. As shown in FIG. 1, the architecture includes an initiating UE (a UE 1), a relay device (a relay UE), and a target UE (a UE 2). Network elements in the UE-to-UE relay system may include one initiating UE 1, one target UE 2, and one or more relay UEs. Unicast communication needs to be performed between the UE 1 and the UE 2. Data or signaling transmission may be performed between the UE 1 and the UE 2 through the relay UE.

Figure 3:
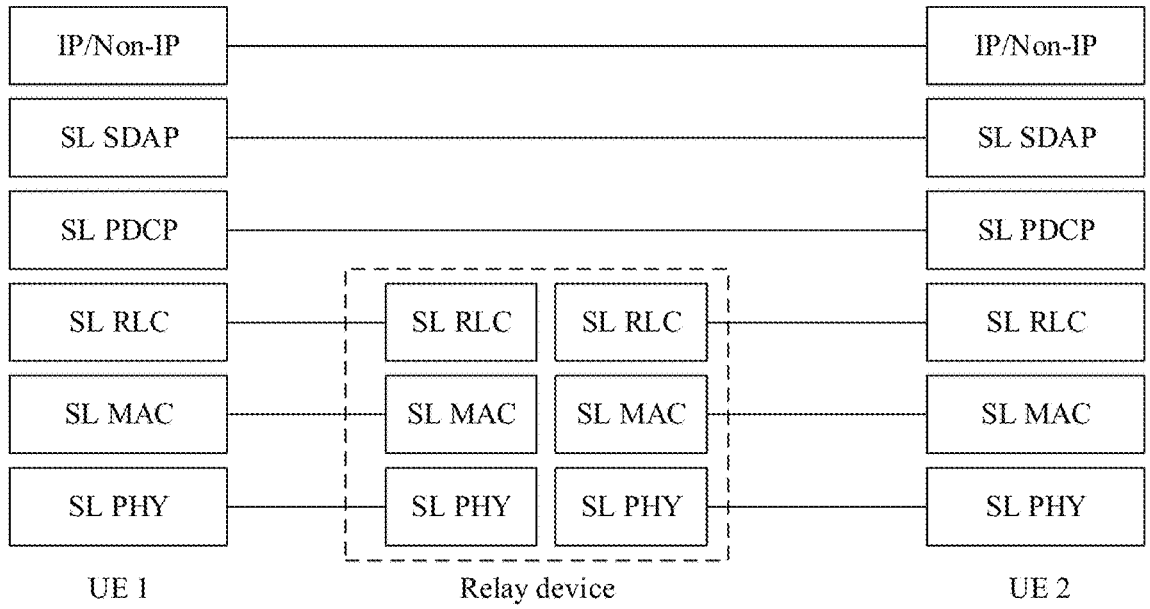
FIG. 3 is a schematic diagram of UE-UE data transmission according to an embodiment of this application.
Figure 4:
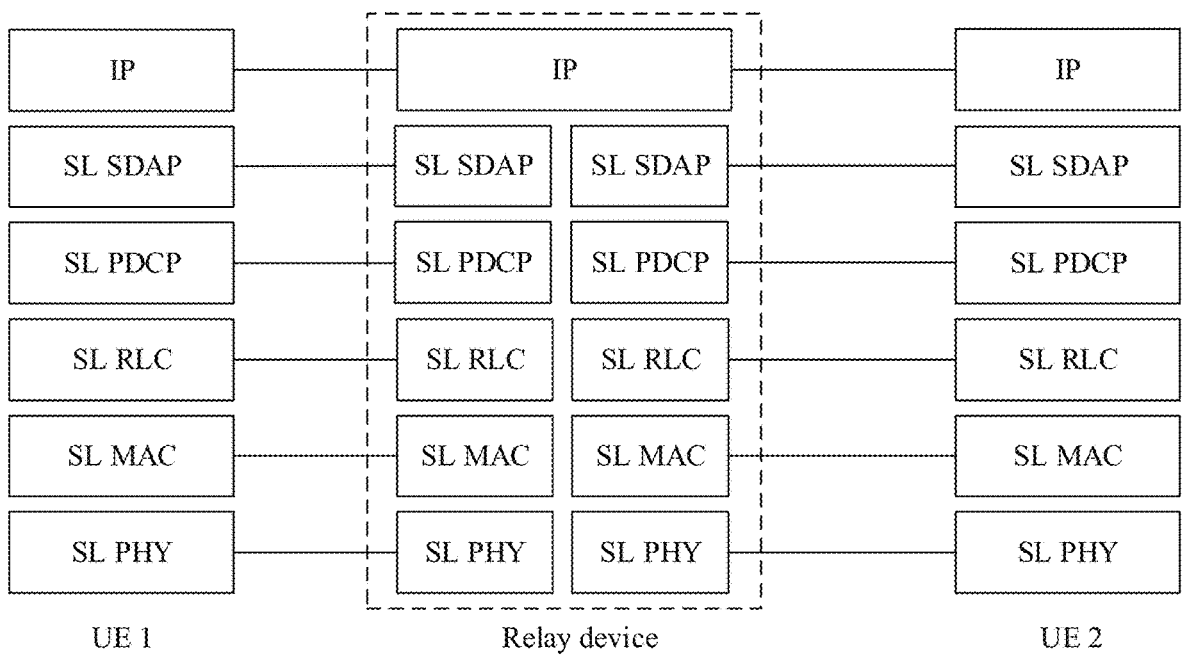
FIG. 4 is another schematic diagram of UE-UE data transmission according to an embodiment of this application.

From a perspective of a user plane protocol stack, UE-to-UE relay may be classified into two types: network layer (layer 3, L3) relay and data link layer (layer 2, L2) relay. FIG. 3 is a schematic diagram of a user plane protocol stack in an L2 relay architecture. User data may be relayed below a packet data convergence protocol (PDCP) layer. In the L2 relay architecture, there is an end-to-end control plane connection between the UE 1 and the UE 2. The control plane connection is further classified into an access stratum (AS) control plane connection (which may be understood as an RRC connection) and an upper layer (which may be understood as a non-access stratum (NAS)) control plane connection. FIG. 4 is a schematic diagram of a user plane protocol stack in an L3 relay architecture. As shown in FIG. 4, user data is relayed at an IP layer. Optionally, in the foregoing relay architectures, there may be further an adaptation layer above an SL radio link control (RLC) layer. Data transmission in the foregoing two architectures belongs to a conventional technology, and details are not excessively described in embodiments of this application.

Figures 5, 6:
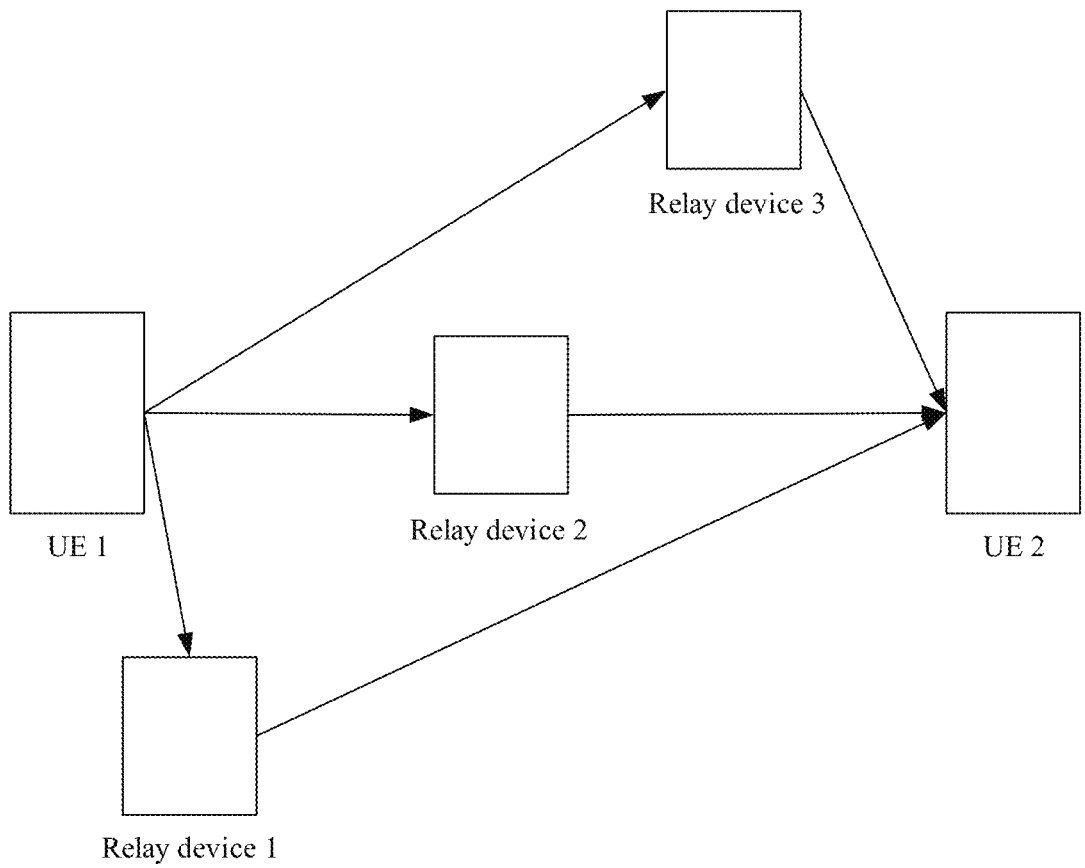
FIG. 5 is a schematic diagram of an architecture of a UE-UE relay system.
FIG. 6 is a schematic diagram of a unicast communication method according to an embodiment of this application.

The foregoing architecture is a schematic diagram of data transmission performed in the user plane protocol stack after the unicast connection is established between the UEs through the relay UE. Before the unicast connection is established between the UEs, an appropriate relay UE needs to be selected. In an actual application process, there may be a plurality of relay UEs between the UE 1 and the UE 2, and there may be no determined relationship between the UE 1, the UE 2, and each of the plurality of relay UEs. In other words, no unicast connection may be established between the relay UE and the UE 1/UE 2, and not all the relay UEs are appropriate for the UE 1 and the UE 2 between which the unicast communication needs to be performed. For example, as shown in FIG. 5, when there are a plurality of relay UEs, a specific relay UE may be excessively far away from the UE 2, and is not appropriate for acting as the relay device between the UE 1 and the UE 2 to transmit data or signaling. However, in a conventional technology, there is no good method for selecting the relay UE in a process of establishing the unicast connection between the UE 1 and the UE 2.

Embodiments of this application provide a unicast communication method. In a unicast connection establishment process, a relay UE, a UE 1, and/or a UE 2 participate/participates in relay UE selection, so that an appropriate relay UE can be selected. This helps improve a success rate of establishing a unicast connection between the UEs, and improve communication quality of unicast communication.

In embodiments of this application, an initiating UE may be a first terminal device, and a target UE may be a second terminal device, or may optionally be a third terminal device. A specific case is determined based on descriptions in different embodiments. A relay device in embodiments of this application may also be referred to as the relay UE.

A reference signal in embodiments of this application may be a demodulation reference signal (DMRS) or a channel state information-reference signal (CSI-RS). A type of the reference signal is not limited in this application.

FIG. 6 is a schematic diagram of a unicast communication method according to an embodiment of this application. As shown in FIG. 6, the method 600 includes S610 and S620. The following describes the two steps in detail.

S610: A first relay device receives a first message sent by a first terminal device, where the first message includes a first identifier of a second terminal device.

The first identifier may be an application layer identifier (APP ID) of the second terminal device.

Optionally, the first message may include service information, for example, a service identifier, of interest to the second terminal device.

In an embodiment, the first message may include indication information indicating the first relay device to forward the first message. Optionally, the indication information may be indication information included in the first message, may be indication information added to a protocol-layer header, for example, a packet data convergence protocol (PDCP)/radio link control (RLC)/media access control (MAC)-layer header, when protocol-layer processing is performed on the first message, or may be indication information added to physical-layer sidelink control information.

In an embodiment, the first message may be only for requesting to discover a target relay device.

In another embodiment, the first message may be for requesting to establish a unicast connection to a target UE. In this embodiment, it may also be understood that the first message is for requesting to establish a unicast connection between an initiating UE and the target UE through a target relay device.

S620: The first relay device sends a second message to the second terminal device when transmission quality of the first message meets a first preset condition.

In an embodiment, the second message is for establishing a first unicast connection, and the first unicast connection is a unicast connection established between the first terminal device and the second terminal device through the first relay device.

Optionally, the second message may be the first message that is directly forwarded, or may be generated by the first relay device based on the first message. In an embodiment, that transmission quality of the first message meets a first preset condition includes: A reference signal received power RSRP of the first message is greater than or equal to a first threshold. Specifically, the first relay device may measure a reference signal that is sent simultaneously with the first message, to obtain a reference signal received power (RSRP) value, and compare the RSRP value with the first threshold. If the RSRP measurement value is greater than the first threshold, the first relay device continues to send the second message; otherwise, the first relay device does not send the second message. Optionally, the first threshold may be obtained by the first relay device from a base station to which the first relay device belongs, may be obtained from the initiating UE, or may be locally configured by the first relay device. This is not limited in this application.

Optionally, the first relay device may alternatively perform determining the transmission quality of the first message based on a signal-to-noise ratio (SNR), a signal to interference plus noise ratio (SINR), reference signal received quality (RSRQ), channel state information (CSI), or the like of a link. Alternatively, the first relay device may determine, depending on whether the first relay device supports a unicast connection service, whether to continue to send the second message to the target UE. It should be understood that the first relay device may perform determining the transmission quality of the received message by using one of the methods or two or more of the methods. This is not limited in this embodiment of this application.

In an embodiment, the first relay device may further perform determining of transmission quality of a message sent by the second terminal device. Specifically, the method further includes: The first relay device receives a third message sent by the second terminal device, where the third message includes the first identifier of the second terminal device. The first relay device forwards the third message to the first terminal device when transmission quality of the third message meets a second preset condition.

The relay device performs determining of the transmission quality of the response message (namely, the third message) of the second terminal device, so that different cases that exist between the relay device and the target UE can be considered, to select a more appropriate target relay device. This improves a success rate of the unicast connection and communication quality of unicast communication.

In an embodiment, that transmission quality of the third message meets a second preset condition includes: An RSRP of the third message is greater than or equal to a second threshold. Specifically, the first relay device may measure a reference signal that is sent simultaneously with the third message to obtain an RSRP value, and then perform determining based on the RSRP measurement value and the second threshold. Optionally, the second threshold may be obtained by the first relay device from the base station to which the first relay device belongs, may be obtained from the initiating UE, or may be locally configured by the first relay device. This is not limited in this application. Optionally, the second threshold in this embodiment of this application may be the same as or different from the first threshold used by the first relay device to perform determining the transmission quality of the first message in the foregoing step. A specific value of the second threshold may be determined based on an actual case. This is not limited in this embodiment of this application.

Optionally, the first relay device may alternatively perform determining the transmission quality of the third message based on an SNR, an SINR, RSRQ, CSI, or the like of a link.

In an embodiment, the first relay device may change a selection criterion, for example, lower the first/second threshold. Specifically, the first relay device receives first indication information, where the first indication information indicates the first relay device to change the first preset condition and/or the second preset condition. Alternatively, optionally, the first relay device may change the selection criterion based on a local configuration, to select the appropriate target relay device.

The preset condition for selecting the target relay device is changed, so that the selection criterion can be changed when no appropriate target relay device is found, to ensure normal service running.

In an embodiment, when the first message is for requesting to establish the unicast communication, the second message may also be for requesting to establish the unicast communication. A unicast communication establishment process belongs to a conventional technology, and details are not excessively described herein.

In another embodiment, when the first message is only for requesting to discover the target relay device, the second message is also only for requesting to discover the target relay device. In this case, the relay device further needs to receive, from the initiating UE, a message for establishing the unicast connection, to establish the unicast connection between the initiating UE and the target UE. Specifically, the method further includes: The first relay device receives a fourth message sent by the first terminal device, where the fourth message is for requesting to establish the first unicast connection. The first relay device forwards the fourth message to the second terminal device. The first relay device receives a fifth message sent by the second terminal device, where the fifth message includes a unicast connection response message. The first relay device forwards the fifth message to the first terminal device. Optionally, the unicast connection response message may be a direct communication accept message, or may be a security establishment related message.

In an embodiment, a unicast connection channel may already exist between the first relay device and the second terminal device. In this case, the first relay device may obtain, in advance, the service information of interest to the second terminal device. Specifically, the unicast connection has been established between the first relay device and the second terminal device. The method further includes: The first relay device receives a sixth message sent by the second terminal device, where the sixth message includes a service identifier of the second terminal device. Optionally, the service identifier of the second terminal device may be the service identifier of interest to the terminal device. The service identifier of interest to the second terminal device is obtained in advance, so that after receiving the first message sent by the initiating UE, the relay device may determine, based on a destination identifier corresponding to the first message, whether a service corresponding to the first message is a service of interest to the second terminal device, and determine, based on a determining result, whether to send the second message to the second terminal device. Specifically, after obtaining the first message, the first relay device may obtain the destination identifier corresponding to the first message, where the destination identifier is a default identifier of the service corresponding to the first message. In this way, the first relay device may determine, based on the destination identifier and the service of the second terminal device, whether to continue to send the second message. The success rate of the unicast connection is improved by using the service information of the second terminal device that is obtained in advance. In addition, the previously established unicast connection channel is reused, so that efficiency of the unicast connection can be improved, and resources can be saved.

In an embodiment, the relay device may allocate local identifiers to different initiating UEs, so that the target UE can distinguish between the different initiating UEs. Specifically, that the first relay device sends a second message to the second terminal device further includes: The first relay device sends a second identifier of the first terminal device when sending the second message, where the second identifier is allocated by the first relay device to the first terminal device.

In an embodiment, the first relay device may receive a response message of the second terminal device after sending the second message. Specifically, the method further includes: The first relay device receives a seventh message and the second identifier that are sent by the second terminal device, where the seventh message includes the first identifier of the second terminal device. Alternatively, the first relay device receives second indication information sent by the second terminal device, where the second indication information indicates the first relay device to release the second identifier of the first terminal device.

In this embodiment of this application, the relay device participates in relay device selection in a unicast communication process, so that not only different cases that exist between the relay device and the initiating UE but also the different cases that exist between the relay device and the target UE are considered. In this way, the more appropriate relay device can be selected in the unicast communication process, to improve the success rate of the unicast connection and the communication quality of the unicast communication.

FIG. 7 is a schematic diagram of another unicast communication method according to an embodiment of this application. As shown in FIG. 7, the method 700 includes steps S710 and S720. The following describes the two steps in detail.

S710: A first relay device receives a first message sent by a second terminal device, where the first message includes a service identifier of the second terminal device.

In an embodiment, a unicast connection has been established between the first relay device and the second terminal device.

Optionally, the identifier of the second terminal device may be a service identifier of interest to the second terminal device.

The relay device may obtain the service identifier of the second terminal device in advance through the previously established unicast connection channel.

Optionally, the previously established unicast connection channel may be established according to the unicast communication method described in the embodiment in FIG. 6, or may be established by using a unicast connection establishment method in a conventional technology. A manner of the previously established unicast connection channel is not limited in this embodiment of this application.

S720: The first relay device determines, based on the service identifier, to send a second message to the second terminal device.

In an embodiment, the second message is for requesting to establish a first unicast connection, and the first unicast connection is a unicast connection between a first terminal device and the second terminal device. Further, in this embodiment, the second unicast connection may be understood as a unicast connection established between the first terminal device and the second terminal device through the first relay device. Specifically, the second terminal device may perform determining the transmission quality of a received request message based on the service identifier in the first message. For example, the second terminal device may determine, based on a destination identifier corresponding to the request message received from the first terminal device, whether a service corresponding to the request message is a service of interest to the second terminal device. The second terminal device determines, based on a determining result, whether to send the second message to the second terminal device.

Determining is performed on the received request message by using the service identifier of the second terminal device that is obtained in advance, and further, the request message for establishing the unicast connection is sent to the second terminal device. In addition, the previously established unicast connection channel is reused, so that efficiency of establishing the unicast connection can be improved, and resources can be saved.

In an embodiment, the method further includes: The first relay device receives a third message sent by the first terminal device, where the third message includes a first identifier of the second terminal device. The first relay device determines, when transmission quality of the third message meets a first preset condition, to send the second message to the second terminal device.

Optionally, the first relay device may determine, based on the service identifier of the second terminal device or the transmission quality of the request message received from the first terminal device, whether to continue to forward the request message to the second terminal device, to select a more appropriate relay device.

Optionally, the second message may be the third message that is directly forwarded, or may be generated by the first relay device based on the third message.

In an embodiment, that transmission quality of the third message meets a first preset condition includes: A reference signal received power RSRP of the third message is greater than or equal to a first threshold.

Optionally, the first relay device may perform determining the transmission quality of the third message based on an SNR, an SINR, RSRQ, CSI, or the like of a link.

In an embodiment, that the first relay device sends the second message to the second terminal device further includes: The first relay device sends a second identifier of the first terminal device when sending the second message, where the second identifier is allocated by the first relay device to the first terminal device.

In this application, because the unicast connection channel has been established between the first relay device and the second terminal device, the second terminal device may reuse the channel to establish unicast connections to a plurality of initiating UEs. A local identifier is allocated to the first terminal device, so that the second terminal device can distinguish between different initiating UEs.

In an embodiment, the method further includes: The first relay device receives a fourth message and the second identifier that are sent by the second terminal device, where the fourth message includes the first identifier of the second terminal device. Alternatively, the first relay device receives first indication information sent by the second terminal device, where the first indication information indicates the first relay device to release the second identifier of the first terminal device.

In this embodiment of this application, the previously established unicast connection channel between the first relay device and the second terminal device is reused to establish unicast connections to different initiating UEs. In addition, the first relay device may further obtain, in advance, service information of interest to the second terminal device, and determine, based on the service information, whether to send the request message to the second terminal device. Compared with a conventional technology, this embodiment helps select the more appropriate relay device, to improve the efficiency of the unicast connection and save the resources.

FIG. 8 is a schematic diagram of another unicast communication method according to an embodiment of this application. As shown in FIG. 8, the method 800 includes steps S810 and S820. The following describes the two steps in detail.

S810: A first relay device receives a first message sent by a first terminal device, where the first message is for requesting to establish a second unicast connection.

In an embodiment, the second unicast connection is a unicast connection between the first terminal device and a third terminal device. Further, in this embodiment, the second unicast connection may be understood as a unicast connection established between the first terminal device and the third terminal device through the first relay device. A unicast connection has been established between the first relay device and the first terminal device.

Optionally, the previously established unicast connection channel may be established according to the unicast communication method described in the embodiment in FIG. 6, or may be established by using a unicast connection establishment method in a conventional technology. A manner of the previously established unicast connection channel is not limited in this embodiment of this application.

It should be understood that a first unicast connection may have been established between the first terminal device and a second terminal device through the first relay device. Herein, the first terminal device may establish, through the unicast connection channel that has been established between the first terminal device and the first relay device, the second unicast connection to the third terminal device different from the second terminal device.

Optionally, the first message may include an identifier, for example, an application layer identifier, of the second terminal device, or may further include service information of interest to the second terminal device.

Optionally, the first message may further include a default layer-2 (layer-2, L2) identifier corresponding to a unicast connection request service. Alternatively, when sending the first message to the first relay device, the first terminal device further sends a default L2 identifier corresponding to a unicast connection service. Because the unicast connection has been established between the first relay device and the first terminal device, the first relay device can identify the default layer identifier without using indication information.

In this embodiment of this application, the unicast connection already exists between the first terminal device and the relay device, so that a UE can reuse the previously established unicast connection channel to establish a unicast connection to a target UE. This improves efficiency of the unicast connection and saves resources.

In an embodiment, that a first relay device receives a first message sent by a first terminal device further includes: The first relay device receives a third identifier of the third terminal device when receiving the first message, where the third identifier is allocated by the first terminal device to the third terminal device.

Because the unicast connection has been established between the first relay device and the first terminal device, the first terminal device may reuse the unicast connection to establish unicast connections to different target UEs. Therefore, the first terminal device may allocate local identifiers to the different target UEs, so that the first terminal device can distinguish between the different target UEs.

S820: The first relay device sends, to the third terminal device, a second message and a corresponding service identifier for establishing the second unicast connection.

In an embodiment, the second message is for requesting to establish the second unicast connection to the third terminal device.

Optionally, the second message may be the first message that is directly forwarded, or may be generated by the first relay device based on the first message.

Optionally, the service identifier corresponding to the second unicast connection may be the default layer-2 identifier received from the first terminal device, or may be generated by the first relay device. Specifically, after receiving the first message, the first relay device may parse a data packet in the first message to obtain the service information corresponding to the first message, to determine the identifier corresponding to the unicast connection service.

Because the unicast connection has been established between the first relay device and the first terminal device, the first terminal device may reuse the unicast connection to establish the unicast connections to the different target UEs. Therefore, the first relay device may allocate local identifiers to the different target UEs, so that the first terminal device can distinguish between the different target UEs.

In an embodiment, the first relay device may perform, based on different cases that exist between the first relay device and the third terminal device, determining of transmission quality of a received message sent by the third terminal device, to select an appropriate target relay device. Specifically, the method further includes: The first relay device receives a third message sent by the third terminal device, where the third message includes a response message for a second unicast connection request. The first relay device determines whether transmission quality of the third message meets a third preset condition.

In an embodiment, that transmission quality of the third message meets a third preset condition includes: An RSRP of the third message is greater than or equal to a third threshold. Specifically, the relay device may measure a reference signal that is sent simultaneously with the third message, to obtain an RSRP value, and then perform determining of the RSRP measurement value based on a first RSRP threshold in the third preset condition. Optionally, the first relay device may alternatively perform determining the transmission quality of the third message based on an SNR, an SINR, RSRQ, CSI, or the like of a link. Optionally, the first threshold may be obtained by at least one candidate relay UE from a base station to which the at least one candidate relay UE belongs, may be obtained from the initiating UE, or may be locally configured by the relay UE. This is not limited in this application.

In an embodiment, when the transmission quality of the third message meets the third preset condition, the method further includes: The first relay device sends a fourth message and a fourth identifier of the third terminal device to the first terminal device, where the fourth message includes a first identifier of the second terminal device, and the fourth identifier is allocated by the first relay device to the third terminal device.

In another embodiment, when the transmission quality of the third message does not meet the third preset condition, the method further includes: The first relay device sends third indication information to the first terminal device, where the third indication information indicates that the first relay device cannot be configured to establish the second unicast connection.

FIG. 9 is a schematic diagram of another unicast communication method according to an embodiment of this application. As shown in FIG. 9, the method 900 includes steps S910 and S920. The following describes the two steps in detail.

S910: A second terminal device receives a first message sent by at least one candidate relay device, where the first message includes a first identifier of the second terminal device.

Optionally, the first identifier of the second terminal device may be an application layer identifier of the second terminal device.

In an embodiment, the first message may be only for requesting to discover a target relay device.

In another embodiment, the first message may be for requesting to establish a unicast connection to a target UE. In this embodiment, it may also be understood that the first message is for requesting to establish a unicast connection between an initiating UE and the target UE through a target relay device.

S920: The second terminal device sends, when transmission quality of the first message meets a first preset condition, a second message to at least one candidate relay device that meets the first preset condition; or when transmission quality of the first message does not meet a first preset condition, the second terminal device discards the first message or makes no response.

In an embodiment, the second message is for establishing a first unicast connection, and the first unicast connection is a unicast connection between a first terminal device and the second terminal device. Further, in this embodiment, the first unicast connection may be understood as a unicast connection established between the first terminal device and the second terminal device through a first relay device, and the first relay device is one of the at least one candidate relay device.

In this embodiment of this application, the second terminal device performs determining of transmission quality of the second message, so that different cases that exist between the relay device and the target UE can be considered, to select a more appropriate target relay device. This improves a success rate of the unicast connection and communication quality of unicast communication.

In an embodiment, that transmission quality of the first message meets a first preset condition includes: A reference signal received power RSRP of the first message is greater than or equal to a first threshold. Specifically, the second terminal device may measure a reference signal that is sent simultaneously with the first message, to obtain a first RSRP value, and then compare the first RSRP value with the first threshold, to select the appropriate target relay device. Optionally, the first threshold may be obtained by the second terminal device from a base station to which the second terminal device belongs, may be obtained from the relay UE or the initiating UE, or may be locally configured by the second terminal device. This is not limited in this application.

Optionally, the second terminal device may alternatively perform determining the transmission quality of the first message based on an SNR, an SINR, RSRQ, CSI, or the like of a link.

In an embodiment, the first message further includes a transmission quality result of a third message, and the third message is sent by the first terminal device to the at least one candidate relay device. That transmission quality of the first message meets a first preset condition further includes: A reference signal received power RSRP of the third message is greater than or equal to a second threshold. Specifically, the second terminal device may measure a reference signal that is sent simultaneously with the third message, to obtain a second RSRP value. Optionally, the second terminal device may obtain two thresholds. The first threshold corresponds to a measurement result of the reference signal for the first message, and the second threshold corresponds to a measurement result of the reference signal for the third message. A corresponding relay device is considered to be selected only when the two measurement results are respectively greater than or equal to the corresponding thresholds. When a plurality of candidate relay devices meet the condition, the second terminal device may autonomously select a candidate relay device, select a candidate relay device with a largest sum of two values, or select a candidate relay device with a largest weighted sum of the two measurement results. In this case, two weighting coefficients and the two thresholds may be obtained by the second terminal device from a network, obtained from the first terminal device, or preconfigured by the second terminal device. Alternatively, optionally, the second terminal device obtains only one first threshold, compares the two measurement results with the first threshold, and selects a corresponding target relay device only when both the two measurement results are greater than or equal to the first threshold. When a plurality of relay devices meet the condition, a processing method is the same as that described above.

In the foregoing embodiment, the second terminal device may perform determining of not only the transmission quality of the received second message but also the transmission quality of the first message received by the relay device, so that the second terminal device can comprehensively consider different cases of a plurality of links between the first terminal device, the target relay device, and the second terminal device, to select the more appropriate target relay device to establish the unicast connection.

In an embodiment, the second terminal device may select, from the plurality of candidate relay devices, only one optimal relay device as the target relay device. Specifically, that the second terminal device sends, when transmission quality of the first message meets a first preset condition, a second message to at least one candidate relay device that meets the first preset condition further includes: The second terminal device selects the first relay device from the at least one candidate relay device based on a second preset condition. The second terminal device sends the second message to the first relay device.

Alternatively, optionally, the second terminal device may select, from the plurality of candidate relay devices based on a first threshold, a plurality of relay devices that meet the condition. This is not limited in this embodiment of this application.

Optionally, the foregoing threshold may be the same as or different from the first threshold and the second threshold that are respectively used by the second terminal device to perform determining the transmission quality of the first message and the third message. A specific case is determined based on an actual requirement. This is not limited in this embodiment of this application.

In an embodiment, after a procedure of the first round of unicast communication, if the second terminal device finds no available target relay device, a criterion for selecting the target relay device may be changed. Optionally, the method further includes: The second terminal device receives first indication information, where the first indication information indicates the second terminal device to change the first preset condition and/or the second preset condition.

The preset condition for selecting the relay device is changed based on an actual case, to ensure normal service running.

In an embodiment, when the first message in this embodiment of this application is for requesting to establish the unicast connection, the method further includes: The second terminal device receives a fourth message sent by the first relay device, where the fourth message is for requesting to establish the first unicast connection. The second terminal device sends a fifth message to the first relay device, where the fifth message includes a unicast connection response message. Optionally, the unicast connection response message may be a direct communication accept message, or may be a security establishment related message.

In an embodiment, unicast connections may already exist between the second terminal device and the plurality of candidate relay devices. In this case, the target UE may establish a unicast connection to another initiating UE by using the previously established unicast connection. Specifically, a unicast connection has been established between the second terminal device and the at least one candidate relay device, and the method further includes: The second terminal device sends a sixth message to the at least one candidate relay device, where the sixth message includes a service identifier of the second terminal device. Optionally, the service identifier may be a service identifier of interest to the second terminal device. Optionally, the previously established unicast connection channel may be established according to the unicast communication method described in the embodiment in FIG. 6, or may be established by using a unicast connection establishment method in a conventional technology. A manner of the previously established unicast connection channel is not limited in this embodiment of this application.

Because the unicast connection has been established between the second terminal device and the relay device, the second relay device may send, in advance, service information (for example, the service identifier) of interest to the second relay device to the relay device that establishes the unicast connection to the second relay device, so that when receiving a request message sent by the initiating UE, the relay device may perform, based on the service information, determining the transmission quality of the request message, to determine whether to continue to send a message to the second terminal device. This improves the success rate of the unicast connection.

When the unicast connection already exists between the second terminal device and the relay device, that the second terminal device determines whether the transmission quality of the first message meets the first preset condition may include different cases. Specifically, because the unicast connection has been established between the second terminal device and the at least one relay device, when all second messages received by the second terminal device come from the at least one candidate relay device that previously establishes the unicast connection channel to the second terminal device, the second terminal device may select, based on a preset condition, one relay device as the target relay device from the at least one candidate relay device. The preset condition may be performing determining based on the transmission quality of the reference signal for the second message, load, or the like.

Alternatively, optionally, when second messages received by the second terminal device come from a candidate relay device that establishes a unicast connection to the second terminal device and one or more other candidate relay devices, if transmission quality of the second messages from the other candidate relay devices is higher than the threshold, an optimal target relay device is selected from the other candidate relay devices based on the preset condition; or if transmission quality of the second messages sent by the other candidate relay device does not meet the preset condition, the candidate relay device that has previously established the unicast connection is selected as the target relay device. For a specific selection process, refer to the foregoing case in which all the second messages come from the candidate relay device that establishes the unicast connection to the second terminal device. Alternatively, the second terminal device may not perform determining the transmission quality of the other candidate relay devices first, but preferentially select the candidate relay device that previously establishes the unicast connection channel to the second terminal device. For a specific selection process, refer to the foregoing case in which all the second messages come from the candidate relay device that establishes the unicast connection to the second terminal device. If no appropriate target relay device is selected, the target relay device is then selected from the other candidate relay devices.

In an embodiment, that a second terminal device receives a first message sent by at least one candidate relay device further includes: The second terminal device receives a second identifier of the first terminal device when receiving the first message, where the second identifier is allocated by the at least one candidate relay device to the first terminal device.

A local identifier is allocated to the first terminal device, so that the target UE can distinguish between different initiating UEs.

In an embodiment, that the second terminal device sends a second message to at least one candidate relay device that meets the first preset condition further includes: The second terminal device sends a second identifier of the second terminal device when sending the second message.

In an embodiment, when the transmission quality of the first message meets the first preset condition, the second terminal device may further send second indication information to the at least one candidate relay device that meets the first preset condition, where the second indication information indicates the first relay device to release the second identifier. When finding that the first message is not for searching for the terminal device, the second terminal device may indicate the relay device to release the identifier allocated to the second terminal device.

In this embodiment of this application, the target UE selects the target relay device in a unicast communication process, to improve the success rate of the unicast connection and the communication quality of the unicast communication.

FIG. 10 is a schematic diagram of another unicast communication method according to an embodiment of this application. As shown in FIG. 10, the method includes S1001. The following describes this step in detail.

S1001: A second terminal device sends a first message to at least one candidate relay device, where the first message includes a service identifier of the second terminal device, and a unicast connection has been established between the second terminal device and the at least one candidate relay device.

Optionally, the service identifier of the second terminal device may be a service identifier of interest to the second terminal device.

The second terminal device may send the service identifier of the second terminal device to the relay device in advance through the previously established unicast connection channel, so that the relay device may perform monitoring for the second terminal device based on the service identifier, to send, to the second terminal device, a request message that conforms with a service of interest to the second terminal device. This improves efficiency of a unicast connection.

Optionally, the previously established unicast connection channel may be established according to the unicast communication method described in the embodiment in FIG. 6, or may be established by using a unicast connection establishment method in a conventional technology. A manner of the previously established unicast connection channel is not limited in this embodiment of this application.

In an embodiment, the method further includes: The second terminal device receives a second message sent by the at least one candidate relay device, where the second message is for requesting to establish a first unicast connection, the first unicast connection is a unicast connection established between a first terminal device and the second terminal device through a first relay device, and the first relay device is one of the at least one candidate relay device. The second terminal device sends a third message to the at least one candidate relay device. Alternatively, when transmission quality of the second message meets a first preset condition, the second terminal device sends a third message to at least one candidate relay device that meets the first preset condition. Alternatively, when transmission quality of the second message does not meet a first preset condition, the second terminal device discards the first message or makes no response. The third message includes a unicast connection response message. Optionally, the unicast connection response message may be a direct communication accept message, or may be a security establishment related message.

Because the unicast connection has been established between the second terminal device and the at least one relay device, when all second messages received by the second terminal device come from the at least one candidate relay device that previously establishes the unicast connection channel to the second terminal device, the second terminal device may directly send the third message to the at least one candidate relay device without performing determining the transmission quality of the second messages; or optionally, the second terminal device may select one relay device as a target relay device from the at least one candidate relay device based on a preset condition, where the preset condition may be performing determining based on transmission quality of a reference signal for the second message, load, or the like.

Alternatively, optionally, when second messages received by the second terminal device come from a candidate relay device that establishes a unicast connection to the second terminal device and one or more other candidate relay devices, if transmission quality of the second messages from the other candidate relay devices is higher than a threshold, an optimal target relay device is selected from the other candidate relay devices based on the preset condition; or if transmission quality of the second messages sent by the other candidate relay device does not meet the preset condition, the candidate relay device that has previously established the unicast connection is selected as the target relay device. For a specific selection process, refer to the foregoing case in which all the second messages come from the candidate relay device that establishes the unicast connection to the second terminal device. Alternatively, the second terminal device may not perform determining the transmission quality of the other candidate relay devices first, but preferentially select the candidate relay device that previously establishes the unicast connection channel to the second terminal device. For a specific selection process, refer to the foregoing case in which all the second messages come from the candidate relay device that establishes the unicast connection to the second terminal device. If no appropriate target relay device is selected, the target relay device is then selected from the other candidate relay devices.

Another step is similar to the content in the embodiment of this application in FIG. 9, and repeated descriptions are not provided in this embodiment of this application.

FIG. 11 is a schematic diagram of another unicast communication method according to an embodiment of this application. As shown in FIG. 9, the method includes S1110 to S1130. The following describes the several steps in detail.

S1110: A first terminal device sends a first message to at least one candidate relay device, where the first message includes a first identifier of a second terminal device.

Content included in the first message is the same as the content included in the first message in the embodiment of this application in FIG. 6. Details are not described herein again.

S1120: The first terminal device receives a second message sent by the at least one candidate relay device, where the second message includes the first identifier of the second terminal device.

Optionally, when the first message is only for requesting to discover a target relay device, the second message may include only a response message for a discovery message. Alternatively, when the first message is for requesting to establish a unicast connection to a target UE, in this embodiment, it may also be understood that the second message is for requesting to establish a unicast connection between an initiating UE and the target UE through a target relay device. The second message may include a unicast connection response message. Optionally, the unicast connection response message may be a direct communication accept message or a security establishment message.

S1130: The first terminal device sends a third message to a first relay device when transmission quality of the second message meets a first preset condition.

In an embodiment, the third message is for establishing a first unicast connection, the first unicast connection is a unicast connection established between the first terminal device and the second terminal device through the first relay device, and the first relay device is one of the at least one candidate relay device.

In this embodiment of this application, the initiating UE performs determining the transmission quality of the relay device in a unicast communication process, to select an appropriate target relay device. This improves a success rate of the unicast connection and quality of unicast communication.

In an embodiment, that transmission quality of the second message meets a first preset condition includes: A reference signal received power RSRP of the second message is greater than or equal to a first threshold. Specifically, the first terminal device may measure a reference signal that is sent simultaneously with the second message, to obtain an RSRP value, and then perform determining of the RSRP measurement value based on the first threshold in the preset condition, to determine whether to send the third message to the first relay device. Optionally, the first terminal device may alternatively perform determining the transmission quality of the second message based on an SNR, an SINR, RSRQ, CSI, or the like of a link. Optionally, the first threshold may be obtained by the first relay device from a base station to which the first relay device belongs, or may be locally configured by the first terminal device. This is not limited in this application.

In an embodiment, the first message is for requesting to establish the first unicast connection, the third message includes first indication information, and the first indication message indicates the second terminal device to establish the first unicast connection to the first terminal device through the first relay device.

In another embodiment, the first message is for requesting to discover the target relay device, and the third message is for requesting to establish the first unicast connection to the second terminal device through the first relay device.

FIG. 12 is a schematic diagram of another unicast communication method according to an embodiment of this application. As shown in FIG. 12, the method 1200 includes steps S1210 and S1220. The following describes the two steps in detail.

S1210: A first terminal device generates a first message, where the first message is for requesting to establish a second unicast connection.

In an embodiment, the first message includes information about a corresponding service identifier for establishing the second unicast connection, where a unicast connection has been established between at least one candidate relay device and the first terminal device, and the second unicast connection is a unicast connection established between the first terminal device and a second terminal device. Further, in this embodiment, the second unicast connection may be understood as a unicast connection established between the first terminal device and a third terminal device through a first relay device. The first relay device is one of the at least one candidate relay device.

S1220: The first terminal device sends the first message to the at least one candidate relay device.

In an embodiment, the method further includes: The first terminal device receives a second message and a second identifier of the second terminal device that are sent by the first relay device, or receives second indication information sent by the first relay device, where the second identifier of the second terminal device is allocated by the first relay device or the first terminal device to the second terminal device, and the second indication information indicates that the first relay device cannot be configured to establish the unicast connection.

Because the first terminal device can establish unicast connections to a plurality of different target UEs through the previously established unicast connection channel between the first terminal device and the first relay device, the first terminal device can distinguish between the different target UEs by allocating local identifiers to the target UEs.

In an embodiment, that the first terminal device sends the first message to the at least one candidate relay device further includes: The first terminal device sends a third identifier of the third terminal device when sending the first message, where the third identifier is allocated by the first terminal device to the third terminal device.

The local identifier is allocated to the target UE, so that the first terminal device can distinguish between the different target UEs.

In an embodiment, after the first round of unicast connection, if the first terminal device does not find an appropriate target relay device to establish the unicast connection, a criterion for selecting the target relay device may be lowered. Optionally, the first terminal device may send indication information to the relay device and/or the target UE, to indicate the relay device and/or the target UE to change a preset condition of the relay device and/or the target UE. Specifically, the method further includes: The first terminal device sends second indication information, where the second indication information indicates the first relay device and the second terminal device to change the preset condition. Alternatively, optionally, the first terminal device may lower, based on a local configuration, the criterion for selecting the target relay device.

The criterion for selecting the target relay device is changed, to ensure that the appropriate target relay device can be found to establish the unicast connection. This ensures normal service running.

In this embodiment of this application, because the unicast connection has been established between the first terminal device and the relay device, the first terminal device may reuse the previously established unicast connection channel to establish the unicast connections to the different target UEs. This improves efficiency of the unicast connection and saves resources.

Figure 13:
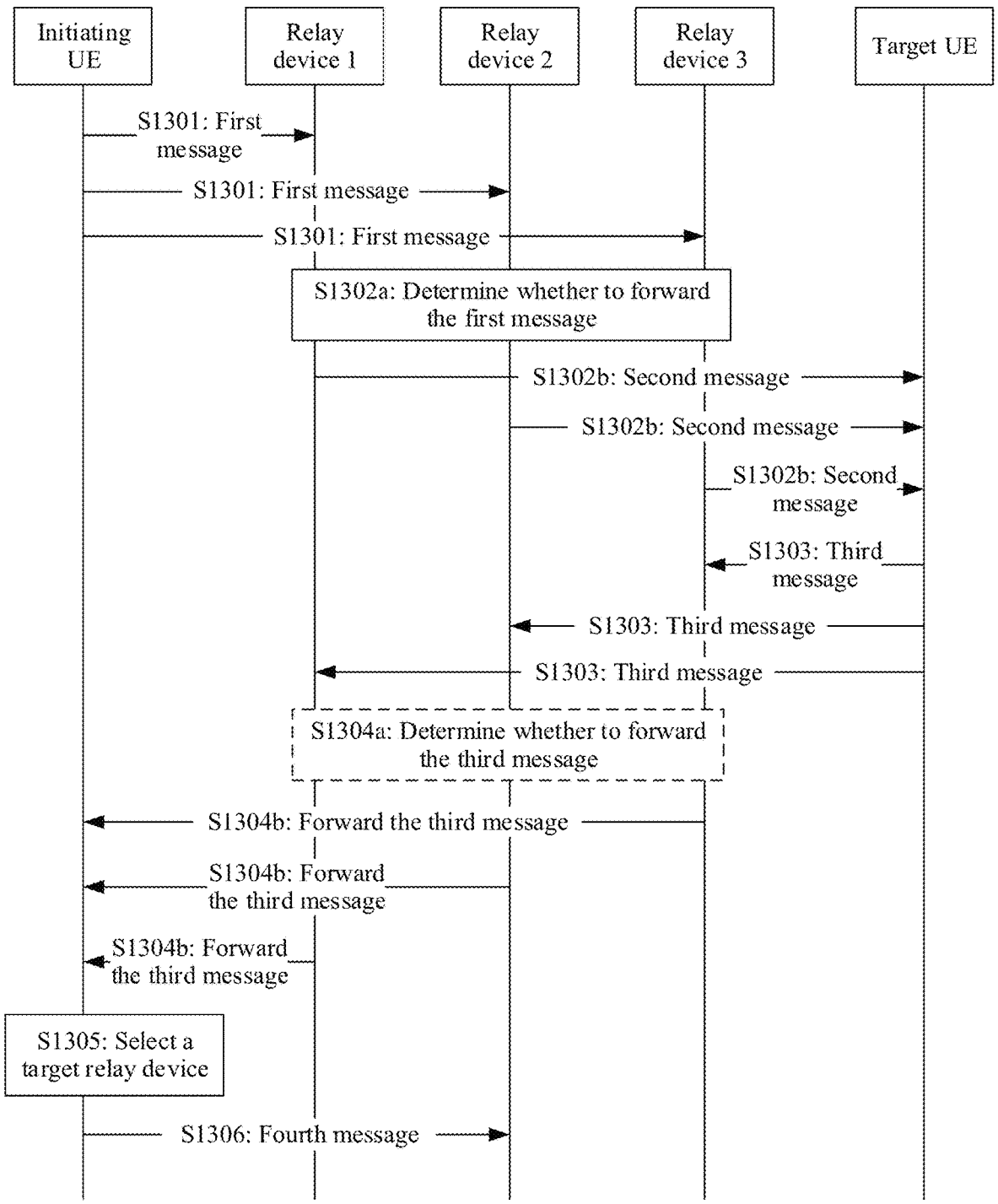
FIG. 13 is a schematic flowchart of unicast establishment according to an embodiment of this application.

FIG. 13 is a schematic flowchart of unicast connection establishment according to an embodiment of this application. As shown in FIG. 13, in S1301, an initiating UE sends a first message to at least one candidate relay device (for example, a relay device 1, a relay device 2, and a relay device 3), where the first message may include identifiers of the initiating UE and a target UE, for example, application layer identifiers (APP IDs) of the UEs, or service information of interest to the target UE.

When sending the first message, the initiating UE further sends a destination identifier and a source identifier. Optionally, the destination identifier herein may be a default identifier corresponding to a unicast connection service. The destination identifier and the source identifier may be carried in a MAC header; or the source identifier is carried in a MAC header, a part of the destination identifier is carried in the MAC header, and the other part is carried in physical-layer sidelink control information (SCI). The first message may include indication information, and the indication information indicates the at least one candidate relay UE to forward the first message. Optionally, the indication information may be indication information included in the first message, may be indication information added to a protocol-layer header, for example, a PDCP/RLC/MAC-layer header when protocol-layer processing is performed by the initiating UE on the first message, or may be indication information added to the physical-layer sidelink control information. Alternatively, the destination identifier may be an identifier corresponding to a service of the relay UE, and the identifier corresponding to the service of the relay UE may be an identifier used by the initiating UE to search for the relay UE and establish a unicast connection to the target UE through the relay device.

Optionally, the first message may be only for searching for the target relay UE. Alternatively, the first message may be for requesting to establish the unicast connection between the initiating UE and the target UE. In this embodiment of this application, it may also be understood that the first message is for requesting to establishing the unicast connection to the target UE through a target relay device. In other words, in this embodiment of this application, a process of searching for the relay UE and a process of establishing the unicast connection between the initiating UE and the target UE may be combined or may be separately performed.

S1302a: The at least one candidate relay UE may perform determining of transmission quality of the received first message, to determine whether to continue to send a second message to the target UE. Optionally, the transmission quality of the first message herein may be: The at least one relay UE may perform determining based on an RSRP of a reference signal that is sent simultaneously with the first message. When an RSRP value that is of the reference signal for the first message and that is obtained through measurement is greater than a first threshold, the relay device sends the second message to the target UE; otherwise, the relay device does not send the second message. Optionally, the first threshold may be obtained by the at least one candidate relay UE from a base station to which the at least one candidate relay UE belongs, may be obtained from the initiating UE, or may be locally configured by the relay UE. This is not limited in this application. It should be understood that the at least one candidate relay UE may store the identifier corresponding to the initiating UE. When finding that the first message carries an identifier of interest to the at least one candidate relay UE or an identifier that the at least one candidate relay UE can identify, the at least one candidate relay UE may accept the discovery message. Alternatively, optionally, the at least one candidate relay UE may perform determining the transmission quality of the first message based on an SNR, an SINR, RSRQ, CSI, or the like of a link, or may determine, depending on whether the relay device supports the unicast connection service, whether to continue to send the second message to the target UE. A manner of performing determining of the signal transmission quality is not limited in this embodiment of this application.

S1302b: The at least one candidate relay UE sends the second message to the target UE, where the second message may include the identifiers of the initiating UE and the target UE or the service information of interest to the target UE in the first message. Optionally, the relay UE may send the second message in a broadcast manner. Optionally, the second message sent by the at least one candidate relay UE may be the first discovery message that is directly forwarded, or may be generated by the at least one candidate relay UE and sent to the target UE. Optionally, the second message may further include indication information for notifying the target UE that the second message is from the relay UE. Optionally, the indication information may be indication information included in the first message, may be indication information added to a protocol-layer header, for example, a PDCP/RLC/MAC-layer header when protocol-layer processing is performed by the initiating UE on the first message, or may be indication information added to physical-layer sidelink control information.

It should be understood that when sending the second message, the at least one relay UE includes a destination identifier and a source identifier. Optionally, the destination identifier herein may be the default identifier corresponding to the unicast connection service or the identifier corresponding to the service of the relay UE. It may be understood that the identifier corresponding to the service of the relay UE is used by the target UE to determine, after the target UE receives the second message, that the message is forwarded by the relay UE. The source identifier herein may be an identifier allocated by the relay UE to perform unicast communication with the target UE.

Optionally, the second message may be the first message that is directly forwarded, or may be generated by the first relay device based on the first message.

Optionally, when the first message is only for discovering the target relay device, the second message is also only for discovering the target relay device. Alternatively, when the first message is further for requesting to establish the unicast connection between the initiating UE and the target UE, the second message may also be for requesting to establish the unicast connection.

S1303: The target UE sends a third message to the at least one candidate relay UE, where the third message may include the identifier, for example, the application layer identifier APP ID, of the target UE. Optionally, a destination identifier used by the target UE to send the third message may be the source identifier used by the relay UE to send the second message.

Optionally, when the first message and the second message are only for discovering the target relay device, the third message may include only a response message in response to discovering the target relay device. Alternatively, when the first message and the second message are for requesting to establish the unicast connection, the third message is a message in response to the request, and may specifically include a direct communication accept message or a security establishment message. In this case, the target UE may establish the unicast connection to the initiating UE through the relay UE. A specific procedure is that shown in FIG. 2. The unicast establishment procedure belongs to a conventional technology, and a manner of establishing the unicast connection is not limited in this application.

Optionally, in S1304a, the at least one relay UE may further perform determining the transmission quality of the third message, and forward the third message when transmission quality of the third message meets a preset condition. Optionally, the at least one relay UE may perform, based on a second RSRP threshold, determining of an RSRP value of a reference signal sent together with the third message. The second threshold may be obtained by the at least one candidate relay UE from a base station to which the at least one candidate relay UE belongs, may be obtained from the initiating UE, or may be locally configured by the relay UE. This is not limited in this application. Optionally, the relay UE may alternatively perform determining the transmission quality of the first message based on an SNR, an SINR, RSRQ, CSI, or the like of a link. This is not limited in this embodiment of this application.

S1304b: The at least one candidate relay UE forwards the third message to the initiating UE, where the third message may include the identifier of the target UE. Optionally, a destination identifier used by the relay UE to send the third message to the initiating UE is the source identifier used by the initiating UE to send the first message, and the relay UE sends the third message to the initiating UE by using the destination identifier.

S1305: The initiating UE selects the target relay UE based on the received third message. Optionally, the initiating UE may measure transmission quality, for example, an RSRP value, of the third message, and select a candidate relay UE with an optimal result as the target relay UE based on a third RSRP threshold. Further, the initiating UE may select the target relay UE based on the third threshold. When none of the candidate relay UEs meets the third threshold, the initiating UE abandons selection of the target relay UE, or re-initiates a first message to search for another target relay UE that meets the condition.

S1306: The initiating UE sends a fourth message to the selected target relay device (herein, the target UE selects the relay device 2 as the target relay device). Optionally, when the first message is only for discovering the target relay device, the fourth message is for requesting to establish a unicast connection to the target UE through the relay device 2. Alternatively, when the first message is further for requesting to establish the unicast connection, the fourth message may include indication information indicating the target UE to establish a unicast connection to the initiating UE through the relay device 2. A specific unicast connection establishment process belongs to the conventional technology, and details are not excessively described in this embodiment of this application.

It should be understood that values of the thresholds in this embodiment of this application may be the same or may be different. Different values may be selected based on an actual case. This is not limited in this embodiment of this application.

Figure 14:
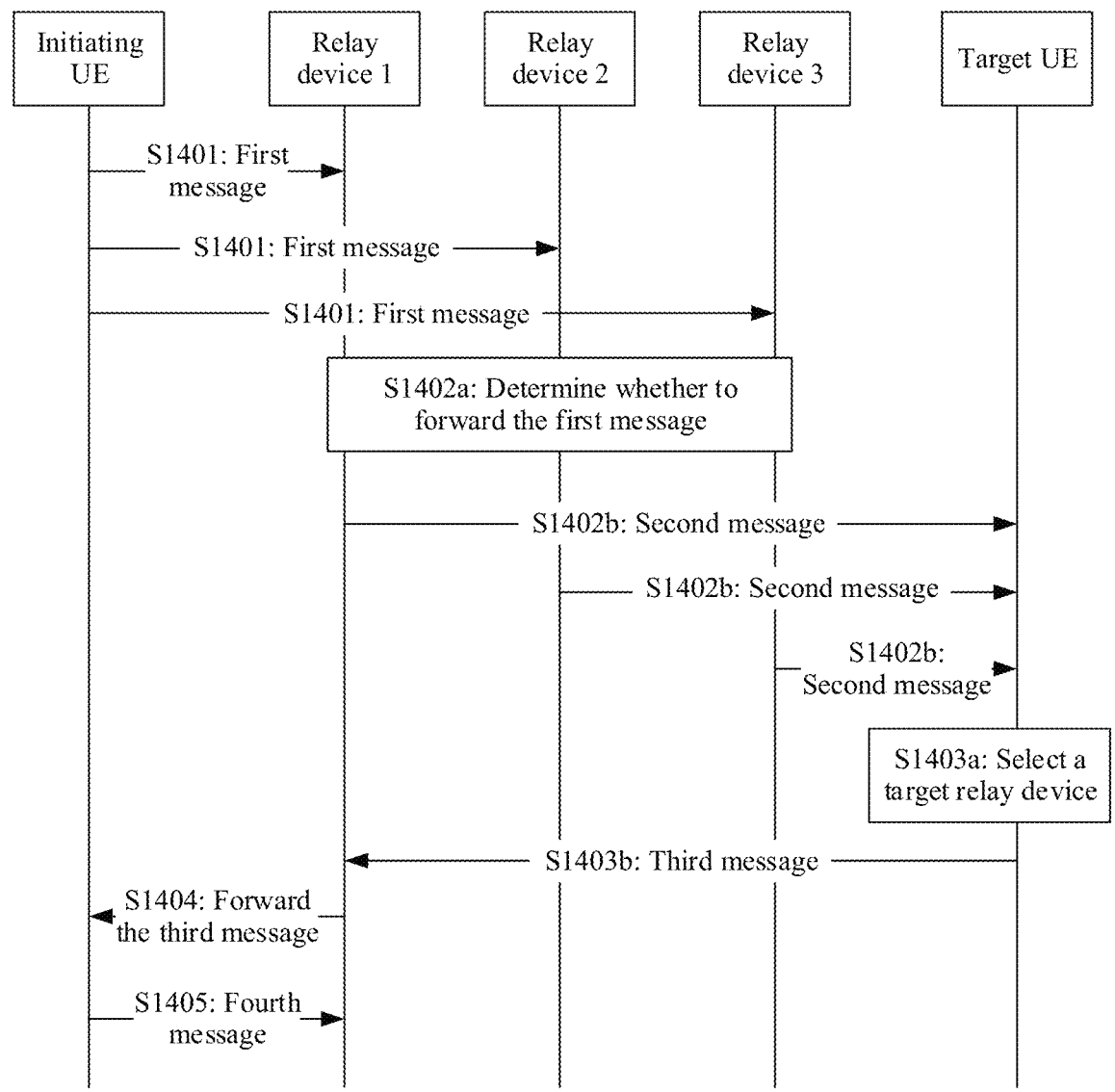
FIG. 14 is another schematic flowchart of unicast connection establishment according to an embodiment of this application.

FIG. 14 is another schematic flowchart of unicast connection establishment according to an embodiment of this application. As shown in FIG. 14, a difference from FIG. 13 lies in: In this embodiment of this application, a target UE may perform selection from at least one candidate relay UE, to determine a target relay UE. S1401 and S1402 are the same as S1301 and S1302. In this embodiment of this application, the first message may be only for requesting to discover the target relay device, or may be further for requesting to establish the unicast connection. This is the same as the content in the embodiment of this application in FIG. 13. Details are not excessively described again in this embodiment of this application.

A difference from the embodiment of this application in FIG. 13 lies in: In this embodiment of this application, the target UE selects the target relay UE from the at least one relay UE, and sends a third message to the target relay device in a unicast manner. S1403a: The target UE may perform, based on a first RSRP threshold, determining of an RSRP value of a received reference signal that is sent simultaneously with the second message. Optionally, the first threshold may be included by the initiating UE in the first message. The relay UE may include the first threshold when sending the second message. Then, the target UE may perform determining based on the first threshold, to select an optimal target relay UE. In this embodiment of this application, the target UE selects the relay device 1 as an optimal target relay UE. Optionally, the at least one candidate relay UE may modify the first threshold and then send a modified first threshold to the target UE. In this case, thresholds in request messages received by the target UE from different candidate relay UEs may be different. Alternatively, the target UE may perform determining the transmission quality of the first message based on an SNR, an SINR, RSRQ, CSI, or the like of a link, or perform, depending on whether the target UE is authorized to establish a unicast connection to the candidate relay UE, selection from the at least one relay UE. A determining manner is not limited in this embodiment of this application.

S1403b: The target UE sends the third message to the relay UE. Optionally, the target UE sends, in a unicast manner, the third message to the target relay device (where the target relay device in this embodiment of this application is the relay device 1) selected in S1403a.

Optionally, when performing selection from the at least one candidate relay UE, the target UE may select, based on the first RSRP threshold, a plurality of relay UEs that meet the requirement. For example, RSRP measurement values of reference signals of the plurality of relay UEs are greater than the threshold of the target UE. In this case, the target UE may send the third message to the plurality of relay UEs that meet the condition.

When the first message sent by the initiating UE is only for requesting to discover the target relay device, the third message may include only a response message in response to requesting to discover the target relay device. Alternatively, when the first message sent by the initiating UE is further for requesting to establish the unicast connection between the initiating UE and the target UE, the third message may include a unicast connection response message. Optionally, the unicast connection response message may be a direct communication accept message, or may be a security establishment procedure related message. The target UE may establish the unicast connection to the initiating UE through the target relay UE by using the two types of messages. A specific establishment process belongs to a conventional technology. The unicast connection establishment process is not limited in this embodiment of this application.

S1404: The target relay UE forwards the third message to the initiating UE. When the first message sent by the initiating UE is only for requesting to discover the target relay device, the third message includes only the response message in response to discovering the target relay device. Alternatively, when the first message sent by the initiating UE is for requesting to establish the unicast connection, after receiving the third message, the initiating UE establishes the unicast connection to the target UE through the target relay UE by using, for example, the direct communication accept message or the security establishment procedure related message in S1403.

Optionally, in S1403a, the target UE selects at least one relay UE that meets the condition, and sends the third message to the at least one relay UE. In this case, the relay UE may further measure a reference signal that is sent simultaneously with the received third message, to obtain an RSRP value, and compare the RSRP value with a second threshold. A specific comparison manner is the same as that in the embodiment in FIG. 13. Details are not excessively described again in this embodiment of this application.

S1405: Optionally, when the first message sent by the initiating UE is only for discovering the target relay UE, to be specific, when a relay UE discovery process and a unicast connection establishment process are independent of each other, the initiating UE may further send a fourth message to the target relay UE after receiving the third message forwarded by the target relay UE, to request to establish the unicast connection to the target UE through the relay device 1. The unicast connection establishment process belongs to the conventional technology, and details are not excessively described in this embodiment of this application.

It should be understood that values of the thresholds in this embodiment of this application may be the same or may be different. Different values may be selected based on an actual case. This is not limited in this embodiment of this application.

Figure 15:
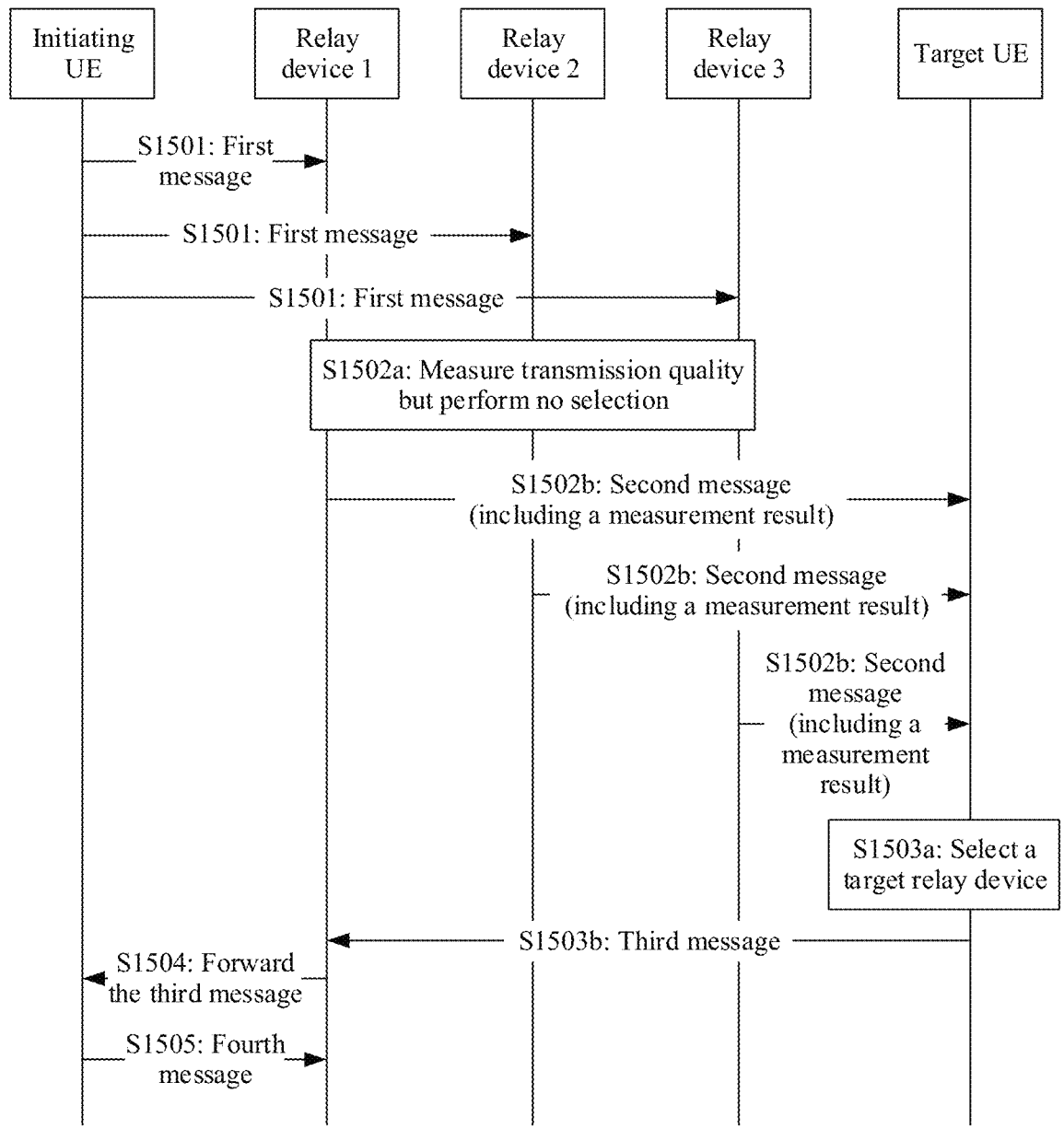
FIG. 15 is another schematic flowchart of unicast connection establishment according to an embodiment of this application.

FIG. 15 is another schematic flowchart of unicast connection establishment according to an embodiment of this application. This embodiment of this application is similar to the embodiment in FIG. 14. A difference lies in: In this embodiment of this application, after measuring a reference signal that is sent simultaneously with a first message sent by an initiating UE, at least one relay UE may not perform determining the transmission quality of the reference signal. In other words, in S1502a, after measuring the reference signal for the first message to obtain an RSRP value, the at least one candidate relay UE may directly send a second message to a target UE without determining, and include, in the second message, an RSRP result that is of the reference signal and that is obtained through measurement.

Optionally, the second message may be the first message that is directly forwarded, or may be generated by the first relay device based on the first message.

S1503a: The target UE measures a received reference signal for the second message of the at least one candidate relay UE to obtain an RSRP value, performs, based on thresholds, determining of a measurement result that is of the reference signal for the first message and that is carried in the second message and a measurement result of the reference signal for the second message, and selects a relay UE that meets a condition. Optionally, the target UE may obtain two thresholds. A first threshold corresponds to the measurement result of the reference signal for the second message, and a second threshold corresponds to the measurement result that is of the reference signal for the first message and that is obtained by the relay UE. A corresponding relay UE is considered to be selected only when the two measurement results are respectively greater than or equal to the corresponding thresholds. When a plurality of relay UEs meet the condition, a UE 2 may autonomously select a candidate relay device, select a candidate relay device with a largest sum of two values, or select a candidate relay device with a largest weighted sum of the two measurement results. In this case, two weighting coefficients and the two thresholds may be obtained by the UE 2 from a network, obtained from a UE 1, or preconfigured by the UE 2. Alternatively, optionally, the UE 2 obtains only one threshold, compares the two measurement results with the threshold, and selects a corresponding relay UE only when both the two measurement results are greater than or equal to the threshold. When a plurality of relay UEs meet the condition, a processing method is the same as that described above. Other steps are the same as those in the embodiments of this application in FIG. 13 and FIG. 14, and details are not excessively described in this embodiment of this application.

Optionally, in this embodiment of this application, the target UE may alternatively perform determining the transmission quality of the second message based on an SNR, an SINR, RSRQ, CSI, or the like of a link in the foregoing embodiment. This is not limited in this embodiment of this application.

The foregoing embodiments of this application relate to a process of discovering the target relay UE and establishing the unicast connection when the initiating UE and the target UE have not established the unicast connection to the relay UE. However, in an actual case, the initiating UE and the target UE may have established the unicast connection to the relay UE.

It should be understood that values of the thresholds in this embodiment of this application may be the same or may be different. Different values may be selected based on an actual case. This is not limited in this embodiment of this application.

Figure 16:
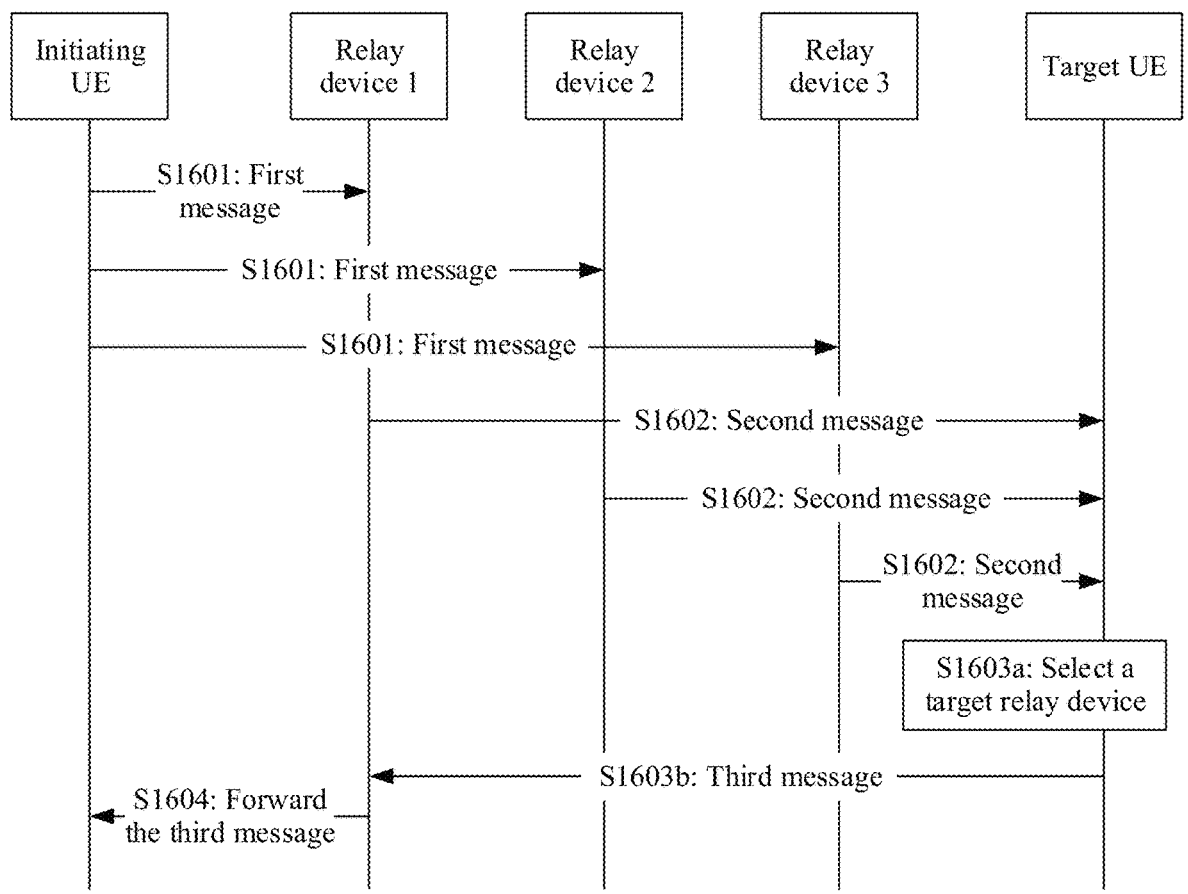
FIG. 16 is another schematic flowchart of unicast connection establishment according to an embodiment of this application.

FIG. 16 is another schematic flowchart of unicast connection establishment according to an embodiment of this application. A unicast connection establishment process in this embodiment of this application is similar to those in FIG. 14 and FIG. 15. A difference lies in: In FIG. 14 and FIG. 15, no unicast connection is established between the initiating UE and the relay UE or between the relay UE and the target UE; in this embodiment of this application, a unicast connection has been established between an initiating UE and at least one candidate relay device. The following describes in detail the unicast connection establishment process in this embodiment of this application.

Optionally, the previously established unicast connection channel may be established according to the unicast communication method described in embodiments of this application, or may be established by using a unicast connection establishment method in a conventional technology. A manner of the previously established unicast connection channel is not limited in this embodiment of this application.

S1601: The initiating UE sends a first message to the at least one candidate relay device in a unicast manner, where the first message is for requesting to establish a unicast connection to a target UE through a target relay device. Optionally, the first message may include an application layer identifier of the initiating UE and an application layer identifier of the target UE. Optionally, when sending the first message, the initiating UE may further include a service identifier. The identifier may be a default layer-2 (layer-2, L2) identifier corresponding to a unicast connection request service. Alternatively, when sending the first message to the at least one candidate relay device, the initiating UE further sends a default L2 identifier corresponding to a unicast connection request service. Optionally, when sending the first message, the initiating UE may further include another identifier of the target UE. The identifier is a local ID allocated by the initiating UE to the target UE, so that the initiating UE distinguishes between different target UEs. It should be understood that the identifier is different from the foregoing application layer identifier of the target UE, and the application layer identifier of the target UE is an inherent identifier of the target UE.

It should be understood that, because the unicast connection has been established between the initiating UE and the at least one candidate relay device, the at least one candidate relay device may perform identification based on the service identifier in the request message sent by the initiating UE.

S1602: After receiving the request message sent by the initiating UE, the at least one candidate relay device broadcasts a second message, where the second message is for requesting to establish the unicast connection to the target UE. Optionally, a destination identifier used for the second message may be the default L2 identifier carried in the first message, or may be an identifier that corresponds to the unicast connection service and that is determined by the at least one candidate relay device. Specifically, after receiving the first message, the relay device may parse a data packet in the first message to obtain service information corresponding to the first message, to determine the identifier corresponding to the unicast connection service. It should be understood that, when sending the second message, the at least one relay device includes a source identifier of the at least one relay device, and different candidate relay devices use different source identifiers.

Optionally, the second message may be the first message that is directly forwarded, or may be generated by a first relay device based on the first message.

Step S1603 is similar to the process in which the target UE selects the relay device in FIG. 14 and FIG. 15. In this step, the target UE selects an optimal candidate relay device as the target relay device. In this embodiment of this application, using a relay device 1 as an example, a third message is sent to the relay device 1. The third message may be a unicast connection response message. Optionally, the unicast connection response message may be a direct communication accept message or a security establishment related message. The target UE may establish the unicast connection to the initiating UE through the relay device 1 by using the unicast connection response message. This process belongs to a conventional technology, and details are not excessively described herein. Optionally, the target UE may alternatively select a plurality of candidate relay devices that meet a condition, and send the third message to the plurality of candidate relay devices that meet the condition.

S1604: The target relay device forwards the third message to the initiating UE. Optionally, the unicast connection established between the relay device and the initiating UE may be reused by a plurality of target UEs, in other words, the relay device may establish unicast connections between the initiating UE and the plurality of target UEs. In this case, when forwarding the third message to the initiating UE, the relay device may include an identifier of the target UE, where the identifier is a local ID allocated by the target relay device or the initiating UE to the target UE, so that the initiating UE can distinguish between different target UEs.

Optionally, in this step, the target relay device may continue to perform determining the transmission quality of the received third message, and determine whether to forward the third message to the initiating UE. The target relay device may measure a reference signal simultaneously received with the third message, to obtain an RSRP value, and then determine, based on a first threshold, whether the RSRP value meets a forwarding condition.

Optionally, when the target relay device determines that the RSRP value for the third message meets the first threshold, the target relay device forwards the third message to the initiating UE, and includes the identifier of the target UE, where the identifier may be allocated by the initiating UE or the target relay device to the target UE. When the target relay device determines that the RSRP value for the third message does not meet the threshold requirement, the target relay device may send indication information to the initiating UE, to indicate that the target relay device cannot be configured to establish the unicast connection between the initiating UE and the target UE.

Through the previously established unicast connection channel, the relay device may directly forward the request message to the target UE without performing filtering on the received unicast establishment request message. In addition, the previously established unicast connection channel is reused to implement the unicast connection to the target UE, to improve efficiency and save resources.

Figure 17:
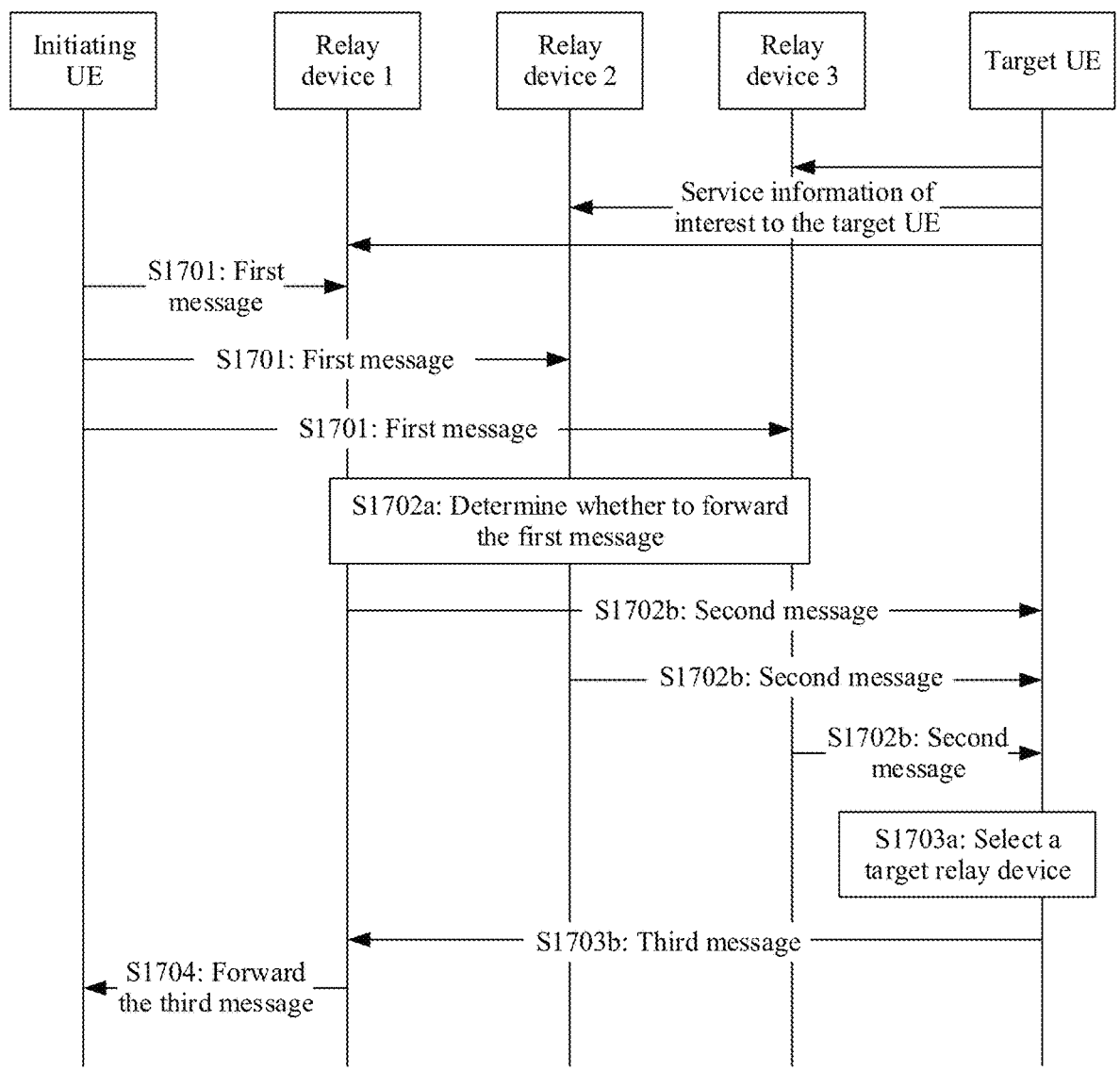
FIG. 17 is another schematic flowchart of unicast connection establishment according to an embodiment of this application.

FIG. 17 is another schematic flowchart of unicast connection establishment according to an embodiment of this application. A unicast connection establishment process in this embodiment of this application is similar to those in FIG. 14 and FIG. 15. A difference lies in: In FIG. 14 and FIG. 15, no unicast connection is established between the initiating UE and the relay UE or between the relay UE and the target UE; in this embodiment of this application, a unicast connection has been established between a target UE and at least one candidate relay device. The following describes in detail the unicast connection establishment process in this embodiment of this application.

Optionally, the previously established unicast connection channel may be established according to the unicast communication method described in embodiments of this application, or may be established by using a unicast connection establishment method in a conventional technology. A manner of the previously established unicast connection channel is not limited in this embodiment of this application.

S1701 is similar to the steps in FIG. 14 and FIG. 15, and details are not excessively described herein again. The first message sent in this step is for requesting to establish a unicast connection to the target UE through a relay device. A destination identifier used for the first message may be a corresponding default L2 identifier for initiating a unicast connection service. Optionally, when sending the first message, an initiating UE may further include indication information indicating that the message is sent to the relay device.

S1702a: The at least one candidate relay device may further measure a reference signal for the received first message, and determine, based on a threshold and a measurement result, whether to send a second message to the target UE. A specific step is similar to the processes in which the relay device determines whether to forward the first message in FIG. 14 and FIG. 15. Details are not excessively described herein again. Optionally, in this embodiment of this application, because the unicast connection may have been established between the target UE and the relay device, the threshold of the relay device may alternatively be obtained from the target UE.

Optionally, the second message may be the first message that is directly forwarded, or may be generated by a first relay device based on the first message.

Before sending the second message to the target UE, the at least one relay device may further perform determining the transmission quality of the received first message based on service information of interest to the target UE. Optionally, the at least one candidate relay device that establishes the unicast connection to the target UE may obtain, in advance, the service information of interest to the target UE or the like. The service information of interest to the target UE may be the default L2 identifier corresponding to the service. After receiving the first message, the relay device that previously establishes the unicast connection to the target UE may determine, based on the service information obtained from the target UE, whether the first message includes a service of interest to the target UE. If the first message includes the service of interest to the target UE, the relay device determines to send the second message to the target UE; otherwise, the relay device does not send the second message.

S1702b: The at least one candidate relay device sends the second message to the target UE in a unicast manner. Optionally, the second message may be the first message, or the second message may be generated by the relay device based on the first message. Optionally, when sending the second message to the target UE, the at least one candidate relay device may further include an identifier of the initiating UE. The identifier is a local ID allocated by the at least one relay device to the initiating UE, so that the target UE distinguishes between different initiating UEs.

S1703a: The target UE may perform determining the transmission quality of the received second message, select a target relay device from the at least one candidate relay device, and send a third message to the target relay device, where the third message may be a unicast connection response message. Optionally, the unicast connection response message may be a direct communication accept message or a security establishment related message. The target UE can establish the unicast connection to the initiating UE through a relay device 1 by using the unicast connection response message. This process belongs to a conventional technology, and details are not excessively described herein again. In this embodiment of this application, the relay device 1 is used as the target relay device. A specific determining process is similar to the processes in FIG. 14 and FIG. 15 performed when the first message is for requesting to establish the unicast connection. Details are not excessively described again in this embodiment of this application. S1703b: The target UE sends the third message to the relay device.

Optionally, if the target UE determines to reply to the target relay device 1 with the third message, when replying with the third message, the target UE may include the identifier allocated by the relay device to the target UE in S1702b. Alternatively, optionally, the target UE may allocate a local ID to the initiating UE. In this case, the third message may carry the identifier allocated by the target UE to the initiating UE. If the target UE finds that the received second message is not for searching for the target UE, the target UE replies to the target relay device 1 with indication information indicating the relay device to release the identifier allocated to the target UE. Optionally, the target UE may reject the unicast connection request of the initiating UE. In this case, the target UE replies to the relay device with a reject message.

S1704: The target relay device forwards the third message to the initiating UE based on the two cases in S1703, or forwards the indication information or the reject message to the initiating UE.

Through the previously established unicast connection channel, the target UE may send, to the at least one relay device in advance, the service information of interest to the target UE, so that when receiving the related request sent by the initiating UE, the relay device may selectively forward the related request to the target UE, to improve communication efficiency.

Optionally, in this embodiment of this application, if the target UE considers that there is no appropriate relay UE, the target UE may reject the request message. The target UE may not reply with any message. Alternatively, optionally, the target UE may select an optimal relay UE from the at least one relay UE to reply with the reject message.

In this embodiment of this application, if no appropriate target relay UE is found after the initiating UE sends the first message for the first time, it may be considered to lower a criterion for selecting the target relay UE, to ensure normal service initiation. Optionally, additional indication information may be carried when the initiating UE sends the first message, so that after receiving the indication information, the at least one relay UE may correspondingly lower the criterion. For example, after receiving the indication information, the at least one candidate relay UE may lower the threshold to a preset value or by a preset value. Alternatively, optionally, the initiating UE resends the first message including a new threshold that is lower, and sends the threshold to the relay UE and/or the target UE, so that the relay UE and/or the target UE can perform selection based on the new threshold. Alternatively, optionally, the initiating UE may set a lower threshold, to lower a threshold criterion for performing determining the transmission quality of the third message sent by the relay UE. Optionally, the preset value in this embodiment of this application may be configured via a network.

Normal service running can be ensured by lowering the threshold criterion when the first unicast connection fails.

The RSRP threshold in this embodiment of this application may be obtained by the UE from a base station to which the UE belongs, may be obtained from the initiating UE, or may be stored by the UE in a local configuration manner. This is not limited in this application.

Optionally, in embodiments of this application, the local identifier allocated by the relay device, the initiating UE, or the target UE may be carried at an adaptation layer above an SL RLC layer in an L2 or L3 relay architecture.

Figure 18:
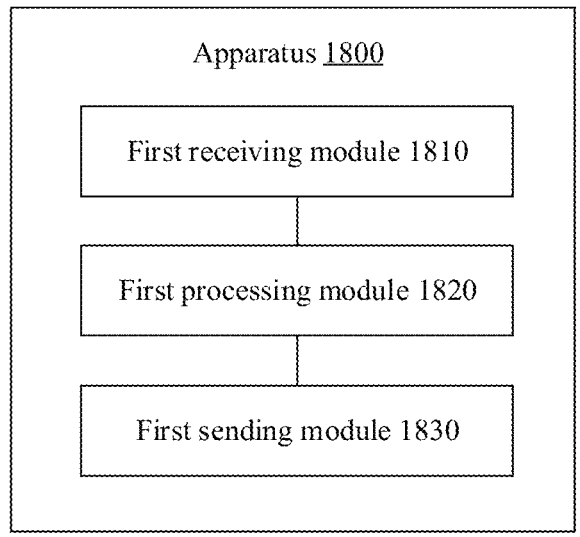
FIG. 18 is a schematic diagram of a unicast communication apparatus according to an embodiment of this application.

FIG. 18 is a schematic diagram of a unicast communication apparatus according to an embodiment of this application. As shown in FIG. 18, the apparatus 1800 includes a first receiving module 1810, a first processing module 1820, and a first sending module 1830. The apparatus 1800 may be configured to implement functions of receiving, processing, and sending a message by the first relay device in any one of the foregoing method embodiments. For example, the apparatus 1800 may be a relay device. In an implementation of the apparatus 1800, the apparatus 1800 includes a unit configured to implement any step or operation in the foregoing method embodiments. The unit may be implemented by hardware, may be implemented by software, or may be implemented by a combination of hardware and software.

The apparatus 1800 may serve as a first relay device to process a message, and perform the step of processing the request message by the first relay device in the foregoing method embodiments. The first receiving module 1810 and the first sending module 1830 may be configured to support the apparatus 1800 in communication, for example, performing a sending/receiving action performed by the first relay device in FIG. 6 to FIG. 12. The first processing module 1820 may be configured to support the apparatus 1800 in performing a processing action in the foregoing methods, for example, performing a processing action performed by the first relay device in FIG. 6 to FIG. 12. Specifically, refer to the following descriptions:

The first receiving module is configured to receive a first message sent by a first terminal device, where the first message includes a first identifier of a second terminal device. The first processing module is configured to determine that transmission quality of the first message meets a first preset condition. The first sending module is configured to send, by the first relay device, a second message to the second terminal device when the transmission quality of the first message meets the first preset condition, where the second message is for establishing a first unicast connection, and the first unicast connection is a unicast connection established between the first terminal device and the second terminal device through the first relay device.

Optionally, the first processing module is specifically configured to determine that a reference signal received power RSRP of the first message is greater than or equal to a first threshold.

Optionally, the first receiving module is further configured to receive a third message sent by the second terminal device, where the third message includes the first identifier of the second terminal device. The first processing module is further configured to determine that transmission quality of the third message meets a second preset condition. The first sending module is further configured to forward the third message to the first terminal device when the transmission quality of the third message meets the second preset condition.

Optionally, the first processing module is specifically configured to determine that an RSRP of the third message is greater than or equal to a second threshold.

Optionally, the first receiving module is further configured to receive first indication information, where the first indication information indicates the apparatus to change the first preset condition and/or the second preset condition.

Optionally, the first message is for requesting to establish the first unicast connection.

Optionally, the first message is for requesting to discover a target relay device.

Optionally, the first receiving module is further configured to receive a fourth message sent by the first terminal device, where the fourth message is for requesting to establish the first unicast connection. The first sending module is further configured to forward the fourth message to the second terminal device. The first receiving module is further configured to receive a fifth message sent by the second terminal device, where the fifth message includes a unicast connection response message. The first sending module is further configured to forward the fifth message to the first terminal device.

Optionally, a unicast connection has been established between the first relay device and the second terminal device. The first receiving module is further configured to receive a sixth message sent by the second terminal device, where the sixth message includes a service identifier of the second terminal device. The first processing module is further configured to determine, based on the service identifier, to send the second message to the second terminal device.

Optionally, a second sending module is further configured to send a second identifier of the first terminal device when sending the second message, where the second identifier is allocated by the apparatus to the first terminal device.

Optionally, the first receiving module is further configured to: receive a seventh message and the second identifier that are sent by the second terminal device, where the seventh message includes the first identifier of the second terminal device; or receive second indication information sent by the second terminal device, where the second indication information indicates the apparatus to release the second identifier of the first terminal device.

Figure 19:
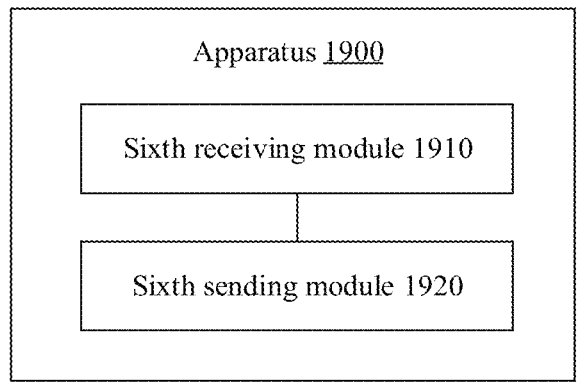
FIG. 19 is a schematic diagram of another unicast communication apparatus according to an embodiment of this application.

FIG. 19 is a schematic diagram of another unicast communication apparatus according to an embodiment of this application. As shown in FIG. 19, the apparatus 1900 includes a sixth receiving module 1910 and a sixth sending module 1920. The apparatus 1900 may be configured to implement functions of receiving, processing, and sending a message by the first relay device in any one of the foregoing method embodiments. For example, the apparatus 1900 may be a relay device. In an implementation of the apparatus 1900, the apparatus 1900 includes a unit configured to implement any step or operation in the foregoing method embodiments. The unit may be implemented by hardware, may be implemented by software, or may be implemented by a combination of hardware and software.

The apparatus 1900 may serve as a first relay device to process a message, and perform the step of processing the request message by the first relay device in the foregoing method embodiments. The sixth receiving module 1910 and the sixth sending module 1920 may be configured to support the apparatus 1900 in communication, for example, performing a sending/receiving action performed by the first relay device in FIG. 6 to FIG. 12. Optionally, the apparatus 1900 may further include a sixth processing module. The sixth processing module may be configured to support the apparatus 1900 in performing a processing action in the foregoing methods, for example, performing a processing action performed by the first relay device in FIG. 6 to FIG. 12. Specifically, refer to the following descriptions:

The sixth receiving module is configured to receive a first message sent by a second terminal device, where the first message includes a service identifier of the second terminal device, and a unicast connection has been established between the first relay device and the second terminal device. The sixth sending module is configured to determine, based on the service identifier, to send a second message to the second terminal device, where the second message is for requesting to establish a first unicast connection, and the first unicast connection is a unicast connection established between a first terminal device and the second terminal device through the first relay device.

Optionally, the sixth receiving module is further configured to receive a third message sent by the first terminal device, where the third message includes a first identifier of the second terminal device. The apparatus further includes the sixth processing module, configured to determine that transmission quality of the third message meets a first preset condition. The sixth sending module is further configured to determine, by the first relay device when the transmission quality of the third message meets the first preset condition, to send the second message to the second terminal device.

Optionally, the sixth processing module is specifically configured to determine that a reference signal received power RSRP of the third message is greater than or equal to a first threshold.

Optionally, the sixth sending module is further configured to send a second identifier of the first terminal device when sending the second message, where the second identifier is allocated by the apparatus to the first terminal device.

Optionally, the sixth receiving module is further configured to: receive a fourth message and the second identifier that are sent by the second terminal device, where the fourth message includes a first identifier of the first terminal device; or receive first indication information sent by the second terminal device, where the first indication information indicates the apparatus to release the second identifier of the first terminal device.

Figure 20:
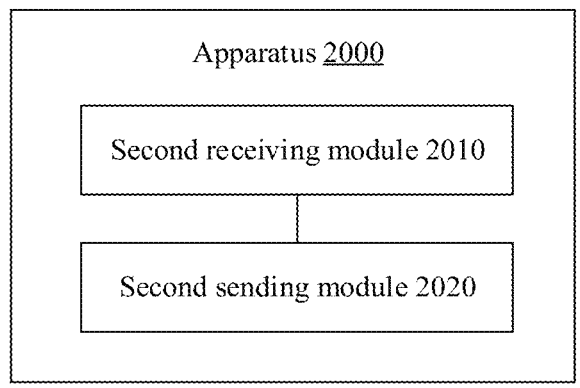
FIG. 20 is a schematic diagram of another unicast communication apparatus according to an embodiment of this application.

FIG. 20 is a schematic diagram of another unicast communication apparatus according to an embodiment of this application. As shown in FIG. 20, the apparatus 2000 includes a second receiving module 2010 and a second sending module 2020. The apparatus 2000 may be configured to implement functions of receiving, processing, and sending a message by the first relay device in any one of the foregoing method embodiments. For example, the apparatus 2000 may be a relay device. In an implementation of the apparatus 2000, the apparatus 2000 includes a unit configured to implement any step or operation in the foregoing method embodiments. The unit may be implemented by hardware, may be implemented by software, or may be implemented by a combination of hardware and software.

The apparatus 2000 may serve as a first relay device to process a message, and perform the step of processing the request message by the first relay device in the foregoing method embodiments. The second receiving module 2010 and the second sending module 2020 may be configured to support the apparatus 2000 in communication, for example, performing a sending/receiving action performed by the first relay device in FIG. 6 to FIG. 12. Optionally, the apparatus 2000 may further include a second processing module. The second processing module may be configured to support the apparatus 2000 in performing a processing action in the foregoing methods, for example, performing a processing action performed by the first relay device in FIG. 6 to FIG. 12. Specifically, refer to the following descriptions:

The second receiving module is configured to receive a first message sent by a first terminal device, where the first message is for requesting to establish a second unicast connection, the second unicast connection is a unicast connection established between the first terminal device and a third terminal device through the apparatus, and a unicast connection has been established between the apparatus and the first terminal device. The second sending module is configured to send, to the third terminal device, a second message and a corresponding service identifier for establishing the second unicast connection, where the second message is for requesting to establish the second unicast connection to the third terminal device.

Optionally, the second receiving module is specifically configured to receive a third identifier of the third terminal device when receiving the first message, where the third identifier is allocated by the first terminal device to the third terminal device.

Optionally, the second receiving module is further configured to receive a third message sent by the third terminal device, where the third message includes a response message for a second unicast connection request. The apparatus further includes the second processing module, configured to determine whether transmission quality of the third message meets a third preset condition.

Optionally, the second processing module is specifically configured to determine that an RSRP of the third message is greater than or equal to a third threshold.

Optionally, the second sending module is further configured to send a fourth message and a fourth identifier of the third terminal device to the first terminal device, where the fourth message includes a first identifier of a second terminal device, and the fourth identifier is allocated by the first relay device to the third terminal device.

Optionally, the second sending module is further configured to send third indication information to the first terminal device, where the third indication information indicates that the apparatus cannot be configured to establish the second unicast connection.

Figure 21:
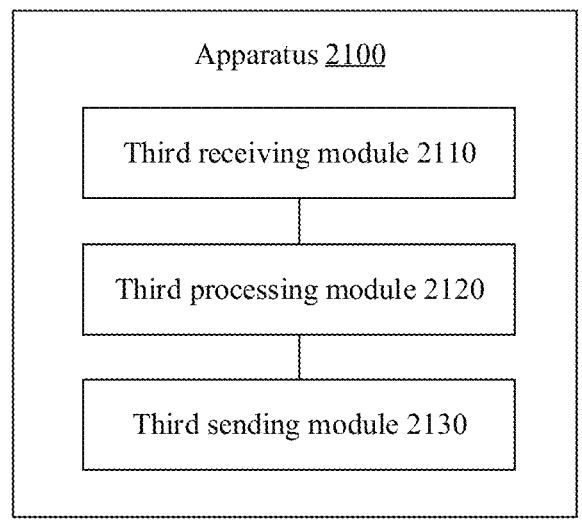
FIG. 21 is a schematic diagram of another unicast communication apparatus according to an embodiment of this application.

FIG. 21 is a schematic diagram of another unicast communication apparatus according to an embodiment of this application. As shown in FIG. 21, the apparatus 2100 includes a third receiving module 2110, a third processing module 2120, and a third sending module 2130. The apparatus 2100 may be configured to implement functions of receiving, processing, and sending a message by the second terminal device in any one of the foregoing method embodiments. For example, the apparatus 2100 may be a second terminal device or a target UE. In an implementation of the apparatus 2100, the apparatus 2100 includes a unit configured to implement any step or operation in the foregoing method embodiments. The unit may be implemented by hardware, may be implemented by software, or may be implemented by a combination of hardware and software.

The apparatus 2100 may serve as the second terminal device or the target UE to process a message, and perform a step of processing a request message by the second terminal device in the foregoing method embodiments. The third receiving module 2110 and the third sending module 2130 may be configured to support the apparatus 2100 in communication, for example, performing a sending/receiving action performed by the second terminal device in FIG. 6 to FIG. 12. The third processing module 2120 may be configured to support the apparatus 2100 in performing a processing action in the foregoing methods, for example, performing a processing action performed by the second terminal device or the target UE in FIG. 6 to FIG. 12. Specifically, refer to the following descriptions:

The third receiving module is configured to receive a first message sent by at least one candidate relay device, where the first message includes a first identifier of the apparatus. The third processing module is configured to determine whether transmission quality of the first message meets a first preset condition. The third sending module is configured to: when the transmission quality of the first message meets the first preset condition, send a second message to at least one candidate relay device that meets the first preset condition, where the second message is for establishing a first unicast connection, the first unicast connection is a unicast connection established between a first terminal device and the apparatus through a first relay device, and the first relay device is one of the at least one candidate relay device; or when the transmission quality of the first message does not meet the first preset condition, discard the first message or make no response.

Optionally, the third processing module is specifically configured to determine that a reference signal received power RSRP of the first message is greater than or equal to a first threshold.

Optionally, the first message further includes a transmission quality result of a third message, and the third message is sent by the first terminal device to the at least one candidate relay device. The third processing module is further configured to determine that a reference signal received power RSRP of the third message is greater than or equal to a second threshold.

Optionally, the third processing module is further configured to select the first relay device from the at least one candidate relay device based on a second preset condition. The third sending module is further configured to send the second message to the first relay device.

Optionally, the third receiving module is further configured to receive first indication information, where the first indication information indicates the apparatus to change the first preset condition and/or the second preset condition.

Optionally, the first message is for requesting to establish the first unicast connection.

Optionally, the first message is for requesting to discover a target relay device.

Optionally, the third receiving module is further configured to receive a fourth message sent by the first relay device, where the fourth message is for requesting to establish the first unicast connection. The third sending module is further configured to send a fifth message to the first relay device, where the fifth message includes a unicast connection response message.

Optionally, a unicast connection has been established between the second terminal device and the at least one candidate relay device. The third sending module is further configured to send a sixth message to the at least one candidate relay device, where the sixth message includes a service identifier of the apparatus.

Optionally, the third receiving module is further configured to receive a second identifier of the first terminal device when receiving the first message, where the second identifier is allocated by the at least one candidate relay device to the first terminal device.

Optionally, the third sending module is further configured to send the second identifier of the first terminal device when sending the second message.

Figure 22:
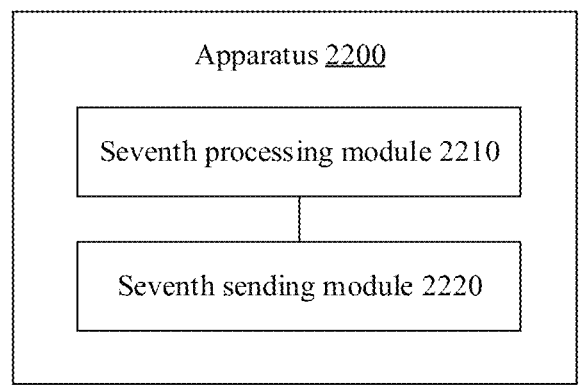
FIG. 22 is a schematic diagram of another unicast communication apparatus according to an embodiment of this application.

FIG. 22 is a schematic diagram of another unicast communication apparatus according to an embodiment of this application. As shown in FIG. 22, the apparatus 2200 includes a seventh processing module 2210 and a seventh sending module 2220. The apparatus 2200 may be configured to implement functions of receiving, processing, and sending a message by the second terminal device in any one of the foregoing method embodiments. For example, the apparatus 2200 may be a second terminal device or a target UE. In an implementation of the apparatus 2200, the apparatus 2200 includes a unit configured to implement any step or operation in the foregoing method embodiments. The unit may be implemented by hardware, may be implemented by software, or may be implemented by a combination of hardware and software.

The apparatus 2200 may serve as the second terminal device or the target UE to process a message, and perform a step of processing a request message by the second terminal device in the foregoing method embodiments. The seventh sending module 2220 may be configured to support the apparatus 2200 in communication, for example, performing a sending/receiving action performed by the second terminal device in FIG. 6 to FIG. 12. The seventh processing module 2210 may be configured to support the apparatus 2200 in performing a processing action in the foregoing methods, for example, performing a processing action performed by the second terminal device or the target UE in FIG. 6 to FIG. 12. Optionally, the apparatus 2200 may further include a seventh receiving module (namely, another example of a communication unit). The seventh receiving module may be configured to support the apparatus 2200 in performing, for example, a sending/receiving action performed by the second terminal device in FIG. 6 to FIG. 12. Specifically, refer to the following descriptions:

The seventh processing module is configured to generate a first message, where the first message includes a service identifier of the apparatus. The seventh sending module is configured to send the first message to at least one candidate relay device, where a unicast connection has been established between the apparatus and the at least one candidate relay device.

Optionally, the apparatus further includes the seventh receiving module, configured to receive a second message sent by the at least one candidate relay device, where the second message is for requesting to establish a first unicast connection, the first unicast connection is a unicast connection established between a first terminal device and the apparatus through a first relay device, and the first relay device is one of the at least one candidate relay device. The seventh sending module is further configured to send a third message to the at least one candidate relay device. Alternatively, the seventh processing module is further configured to determine whether transmission quality of the second message meets a first preset condition. When the transmission quality of the second message meets the first preset condition, the seventh sending module is further configured to send a third message to at least one candidate relay device that meets the first preset condition, where the third message includes a unicast connection response message. Alternatively, when the transmission quality of the second message does not meet the first preset condition, the apparatus discards the second message or makes no response.

Optionally, the seventh processing module is specifically configured to determine that a reference signal received power RSRP of the second message is greater than or equal to a first threshold.

Optionally, the second message further includes a transmission quality result of a fourth message, where the fourth message is sent by the first terminal device to the at least one candidate relay device. The seventh processing module is further configured to determine that a reference signal received power RSRP of the fourth message is greater than or equal to a second threshold.

Optionally, the seventh processing module is further configured to select the first relay device from the at least one candidate relay device based on a second preset condition. The seventh sending module is further configured to send the third message to the first relay device.

Optionally, the seventh receiving module is further configured to receive first indication information, where the first indication information indicates the apparatus to change the first preset condition and/or the second preset condition.

Optionally, the seventh receiving module is further configured to receive a second identifier of the first terminal device when receiving the second message, where the second identifier is allocated by the at least one candidate relay device to the first terminal device.

Optionally, the seventh sending module is further configured to send a second identifier of the first terminal device when sending the third message.

Optionally, the seventh sending module may be further configured to send second indication information to the at least one candidate relay device, where the second indication information indicates the at least one candidate relay device to release the second identifier.

Figure 23:
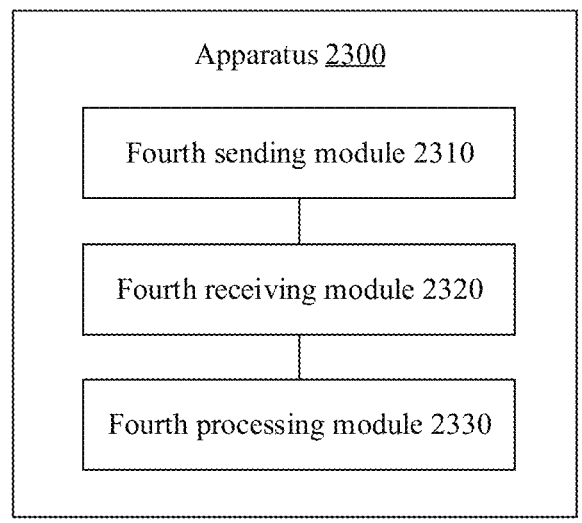
FIG. 23 is a schematic diagram of another unicast communication apparatus according to an embodiment of this application.

FIG. 23 is a schematic diagram of another unicast communication apparatus according to an embodiment of this application. As shown in FIG. 23, the apparatus 2300 includes a fourth sending module 2310, a fourth receiving module 2320, and a fourth processing module 2330. The apparatus 2300 may be configured to implement functions of receiving, processing, and sending a message by the first terminal device in any one of the foregoing method embodiments. For example, the apparatus 2300 may be a first terminal device or an initiating UE. In an implementation of the apparatus 2300, the apparatus 2300 includes a unit configured to implement any step or operation in the foregoing method embodiments. The unit may be implemented by hardware, may be implemented by software, or may be implemented by a combination of hardware and software.

The apparatus 2300 may serve as the first terminal device or the initiating UE to process a message, and perform a step of processing a request message by the first terminal device in the foregoing method embodiments. The fourth receiving module 2320 and the fourth sending module 2310 may be configured to support the apparatus 2300 in communication, for example, performing a sending/receiving action performed by the first terminal device in FIG. 6 to FIG. 12. The fourth processing module 2330 may be configured to support the apparatus 2300 in performing a processing action in the foregoing methods, for example, performing a processing action performed by the first terminal device or the initiating UE in FIG. 6 to FIG. 12. Specifically, refer to the following descriptions:

The fourth sending module is configured to send a first message to at least one candidate relay device, where the first message includes a first identifier of a second terminal. The fourth receiving module is configured to receive a second message sent by the at least one candidate relay device, where the second message includes the first identifier of the second terminal device. The fourth processing module is configured to determine that transmission quality of the second message meets a first preset condition. The fourth sending module is further configured to send a third message to a first relay device when the transmission quality of the second message meets the first preset condition, where the third message is for establishing a first unicast connection, the first unicast connection is a unicast connection established between the apparatus and the second terminal device through the first relay device, and the first relay device is one of the at least one candidate relay device.

Optionally, the fourth processing module is specifically configured to determine that a reference signal received power RSRP of the second message is greater than or equal to a first threshold.

Optionally, the first message is for requesting to establish the first unicast connection, the third message includes first indication information, and the first indication message indicates the second terminal device to establish the first unicast connection to the apparatus through the first relay device.

Optionally, the first message is for requesting to discover a target relay device, and the third message is for requesting to establish the first unicast connection to the second terminal device through the first relay device.

Figure 24:
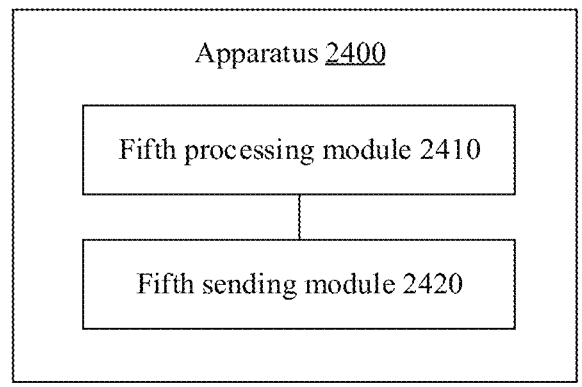
FIG. 24 is a schematic diagram of another unicast communication apparatus according to an embodiment of this application.

FIG. 24 is a schematic diagram of another unicast communication apparatus according to an embodiment of this application. As shown in FIG. 24, the apparatus 2400 includes a fifth processing module 2410 and a fifth sending module 2420. The apparatus 2400 may be configured to implement functions of receiving, processing, and sending a message by the first terminal device in any one of the foregoing method embodiments. For example, the apparatus 2400 may be a first terminal device or an initiating UE. In an implementation of the apparatus 2400, the apparatus 2400 includes a unit configured to implement any step or operation in the foregoing method embodiments. The unit may be implemented by hardware, may be implemented by software, or may be implemented by a combination of hardware and software.

The apparatus 2400 may serve as the first terminal device or the initiating UE to process a message, and perform a step of processing a request message by the first terminal device in the foregoing method embodiments. The fifth sending module 2420 may be configured to support the apparatus 2400 in communication, for example, performing a sending/receiving action performed by the first terminal device in FIG. 6 to FIG. 12. The fifth processing module 2410 may be configured to support the apparatus 2400 in performing a processing action in the foregoing methods, for example, performing a processing action performed by the first terminal device or the initiating UE in FIG. 6 to FIG. 12. Optionally, the apparatus 2400 may further include a fifth receiving module (namely, another example of a communication unit). The fifth receiving module may be configured to support the apparatus 2400 in performing, for example, a sending/receiving action performed by the first terminal device in FIG. 6 to FIG. 12. Specifically, refer to the following descriptions:

The fifth processing module is configured to generate a first message, where the first message is for requesting to establish a second unicast connection, the first message includes information about a corresponding service identifier for establishing the second unicast connection, a unicast connection has been established between the apparatus and at least one candidate relay device, the second unicast connection is a unicast connection established between the apparatus and a third terminal device through a first relay device, and the first relay device is one of the at least one candidate relay device. The fifth sending module is configured to send the first message to the at least one candidate relay device.

Optionally, the apparatus further includes the fifth receiving module, configured to: receive a second message and a second identifier of a second terminal device that are sent by the first relay device, or receive second indication information sent by the first relay device, where the second identifier of the second terminal device is allocated by the first relay device or the apparatus to the second terminal device, and the second indication information indicates that the first relay device cannot be configured to establish the unicast connection.

Optionally, the fifth sending module is further configured to send a third identifier of the third terminal device when sending the first message, where the third identifier is allocated by the apparatus to the third terminal device.

Optionally, the fifth sending module is further configured to send second indication information, where the second indication information indicates the first relay device and the second terminal device to change a preset condition.

Figure 25:
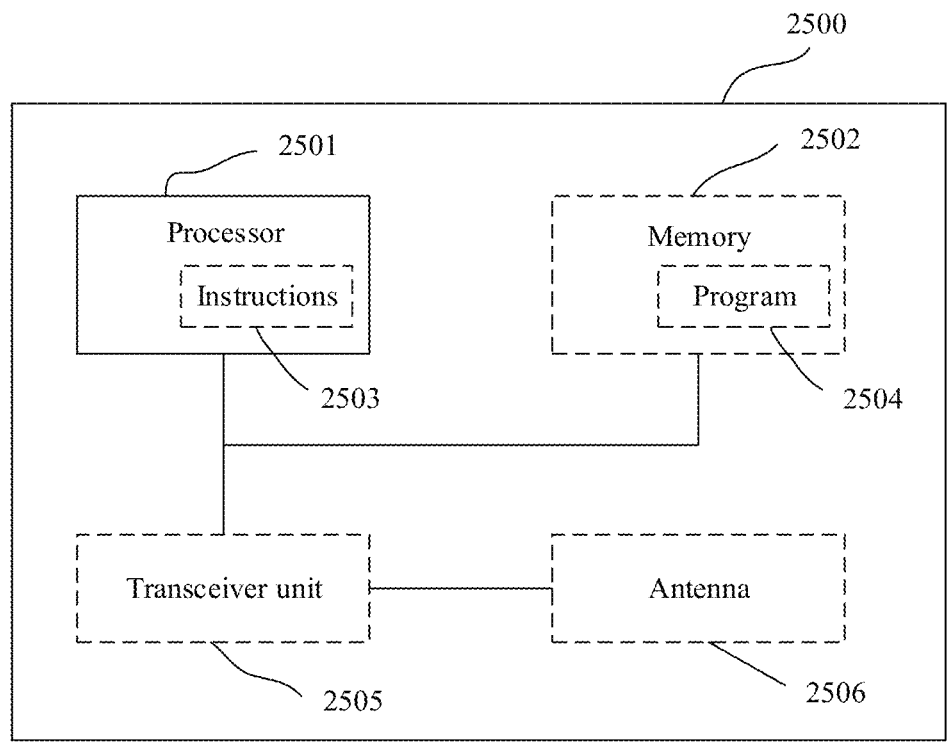
FIG. 25 is a schematic diagram of a structure of a communication apparatus according to an embodiment of this application.

FIG. 25 is a schematic diagram of a structure of a communication apparatus according to an embodiment of this application. The communication apparatus 2500 may be configured to implement the method related to the first relay device described in the foregoing method embodiments. The communication apparatus 2500 may be a chip.

The communication apparatus 2500 includes one or more processors 2501. The one or more processors 2501 may support the communication apparatus 2500 in implementing the communication methods in FIG. 3 to FIG. 5. The processor 2501 may be a general-purpose processor or a special-purpose processor. For example, the processor 2501 may be a central processing unit (CPU) or a baseband processor. The baseband processor may be configured to process communication data. The CPU may be configured to control the communication apparatus (for example, a network device, a terminal device, or the chip), execute a software program, and process data of the software program. The communication apparatus 2500 may further include a transceiver unit 2505, configured to input (receive) and output (send) a signal.

For example, the communication apparatus 2500 may be the chip, and the transceiver unit 2505 may be an input circuit and/or an output circuit of the chip, or the transceiver unit 2505 may be a communication interface of the chip. The chip may be used as a component of the terminal device, the network device, or another wireless communication device.

The communication apparatus 2500 may include one or more memories 2502. The memory 2502 stores a program 2504. The program 2504 may be run by the processor 2501 to generate instructions 2503, to enable the processor 2501 to perform, according to the instructions 2503, the methods described in the foregoing method embodiments. Optionally, the memory 2502 may further store data. Optionally, the processor 2501 may further read the data stored in the memory 2502. The data and the program 2504 may be stored at a same storage address, or may be stored at different storage addresses.

The processor 2501 and the memory 2502 may be configured separately, or may be integrated together, for example, integrated on a single board or a system on a chip (SOC).

The communication apparatus 2500 may further include the transceiver unit 2505 and an antenna 2506. The transceiver unit 2505 may be referred to as a transceiver or a transceiver circuit, and is configured to implement a transceiver function of the communication apparatus through the antenna 2506.

It should be understood that the steps in the foregoing method embodiments may be completed by using a logic circuit in a form of hardware or instructions in a form of software in the processor 2501. The processor 2501 may be a CPU, a digital signal processor (DSP), an application-specific integrated circuit (ASIC), a field programmable gate array (FPGA), or another programmable logic device, for example, a discrete gate, a transistor logic device, or a discrete hardware component.

Figure 26:
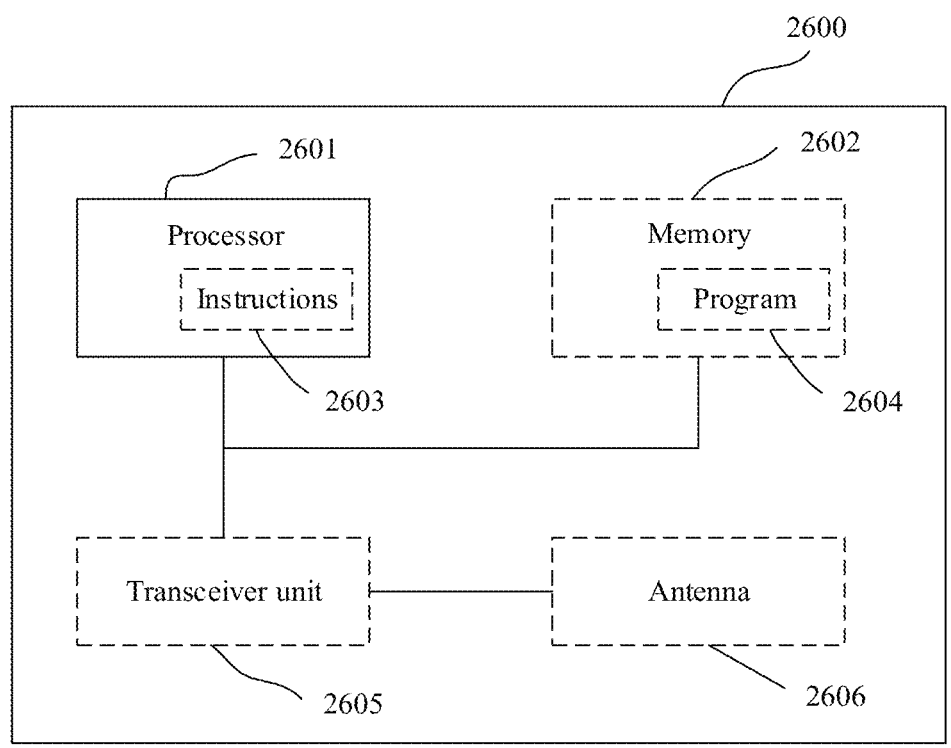
FIG. 26 is a schematic diagram of another structure of a communication apparatus according to an embodiment of this application.

FIG. 26 is a schematic diagram of another structure of a communication apparatus according to an embodiment of this application. The communication apparatus 2600 may be configured to implement the method related to the first relay device described in the foregoing method embodiments. The communication apparatus 2600 may be a chip.

The communication apparatus 2600 includes one or more processors 2601. The one or more processors 2601 may support the communication apparatus 2600 in implementing the communication methods in FIG. 3 to FIG. 5. The processor 2601 may be a general-purpose processor or a special-purpose processor. For example, the processor 2601 may be a central processing unit (CPU) or a baseband processor. The baseband processor may be configured to process communication data. The CPU may be configured to control the communication apparatus (for example, a network device, a terminal device, or the chip), execute a software program, and process data of the software program. The communication apparatus 2600 may further include a transceiver unit 2605, configured to input (receive) and output (send) a signal.

For example, the communication apparatus 2600 may be the chip, and the transceiver unit 2605 may be an input circuit and/or an output circuit of the chip, or the transceiver unit 2605 may be a communication interface of the chip. The chip may be used as a component of the terminal device, the network device, or another wireless communication device.

The communication apparatus 2600 may include one or more memories 2602. The memory 2602 stores a program 2604. The program 2604 may be run by the processor 2601 to generate instructions 2603, to enable the processor 2601 to perform, according to the instructions 2603, the methods described in the foregoing method embodiments. Optionally, the memory 2602 may further store data. Optionally, the processor 2601 may further read the data stored in the memory 2602. The data and the program 2604 may be stored at a same storage address, or may be stored at different storage addresses.

The processor 2601 and the memory 2602 may be configured separately, or may be integrated together, for example, integrated on a single board or a system on a chip (SOC).

The communication apparatus 2600 may further include the transceiver unit 2605 and an antenna 2606. The transceiver unit 2605 may be referred to as a transceiver or a transceiver circuit, and is configured to implement a transceiver function of the communication apparatus through the antenna 2606.

It should be understood that the steps in the foregoing method embodiments may be completed by using a logic circuit in a form of hardware or instructions in a form of software in the processor 2601. The processor 2601 may be a CPU, a digital signal processor (DSP), an application-specific integrated circuit (ASIC), a field programmable gate array (FPGA), or another programmable logic device, for example, a discrete gate, a transistor logic device, or a discrete hardware component.

Figure 27:
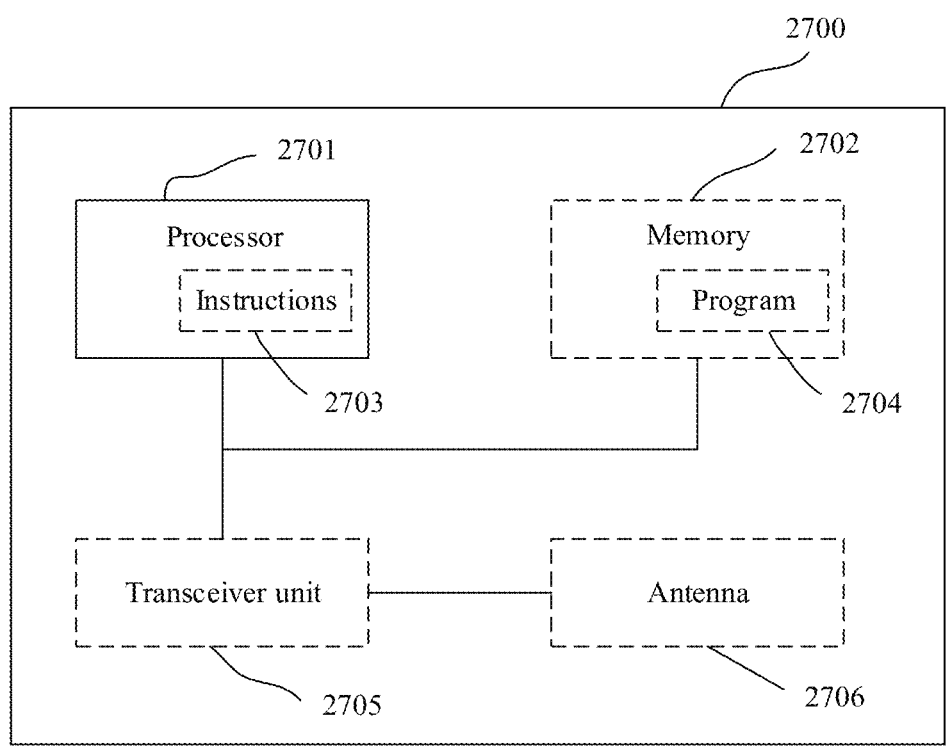
FIG. 27 is a schematic diagram of another structure of a communication apparatus according to an embodiment of this application.

FIG. 27 is a schematic diagram of another structure of a communication apparatus according to an embodiment of this application. The communication apparatus 2700 may be configured to implement the method related to the first relay device described in the foregoing method embodiments. The communication apparatus 2700 may be a chip.

The communication apparatus 2700 includes one or more processors 2701. The one or more processors 2701 may support the communication apparatus 2700 in implementing the communication methods in FIG. 3 to FIG. 5. The processor 2701 may be a general-purpose processor or a special-purpose processor. For example, the processor 2701 may be a central processing unit (CPU) or a baseband processor. The baseband processor may be configured to process communication data. The CPU may be configured to control the communication apparatus (for example, a network device, a terminal device, or the chip), execute a software program, and process data of the software program.

The communication apparatus 2700 may further include a transceiver unit 2705, configured to input (receive) and output (send) a signal.

For example, the communication apparatus 2700 may be the chip, and the transceiver unit 2705 may be an input circuit and/or an output circuit of the chip, or the transceiver unit 2705 may be a communication interface of the chip. The chip may be used as a component of the terminal device, the network device, or another wireless communication device.

The communication apparatus 2700 may include one or more memories 2702. The memory 2702 stores a program 2704. The program 2704 may be run by the processor 2701 to generate instructions 2703, to enable the processor 2701 to perform, according to the instructions 2703, the methods described in the foregoing method embodiments. Optionally, the memory 2702 may further store data. Optionally, the processor 2701 may further read the data stored in the memory 2702. The data and the program 2704 may be stored at a same storage address, or may be stored at different storage addresses.

The processor 2701 and the memory 2702 may be configured separately, or may be integrated together, for example, integrated on a single board or a system on a chip (SOC).

The communication apparatus 2700 may further include the transceiver unit 2705 and an antenna 2706. The transceiver unit 2705 may be referred to as a transceiver or a transceiver circuit, and is configured to implement a transceiver function of the communication apparatus through the antenna 2706.

It should be understood that the steps in the foregoing method embodiments may be completed by using a logic circuit in a form of hardware or instructions in a form of software in the processor 2701. The processor 2701 may be a CPU, a digital signal processor (DSP), an application-specific integrated circuit (ASIC), a field programmable gate array (FPGA), or another programmable logic device, for example, a discrete gate, a transistor logic device, or a discrete hardware component.

An embodiment of this application further provides a chip system, including a processor, where the processor is coupled to a memory. The memory is configured to store a program or instructions. When the program or the instructions is/are executed by the processor, the chip system is enabled to implement the method in any one of the foregoing method embodiments.

Optionally, there may be one or more processors in the chip system. The processor may be implemented by hardware, or may be implemented by software. When the processor is implemented by the hardware, the processor may be a logic circuit, an integrated circuit, or the like. When the processor is implemented by the software, the processor may be a general-purpose processor, and is implemented by reading software code stored in the memory.

Optionally, there may also be one or more memories in the chip system. The memory may be integrated with the processor, or may be separated from the processor. This is not limited in this application. For example, the memory may be a non-transitory memory, for example, a read-only memory ROM. The memory and the processor may be integrated on a same chip, or may be separately configured on different chips. A type of the memory and a manner of configuring the memory and the processor are not specifically limited in this application.

For example, the chip system may be a field programmable gate array (FPGA), an application-specific integrated circuit (ASIC), a system on a chip (SoC), a central processing unit (CPU), a network processor (NP), a digital signal processor (DSP), a microcontroller unit (MCU), a programmable logic device (PLD), or another integrated chip.

It should be understood that the steps in the foregoing method embodiments may be completed by using a hardware integrated logic circuit or instructions in a software form in the processor. The steps of the methods according to embodiments of this application may be directly performed and completed by a hardware processor, or may be performed and completed by a combination of hardware and a software module in the processor.

An embodiment of this application further provides a computer-readable storage medium. The computer storage medium stores computer-readable instructions. When a computer reads and executes the computer-readable instructions, the computer is enabled to perform the method in any one of the foregoing method embodiments.

An embodiment of this application further provides a computer program product. When a computer reads and executes the computer program product, the computer is enabled to perform the method in any one of the foregoing method embodiments.

An embodiment of this application further provides a communication system. The communication system includes a first network slice selection network element, a second network slice selection network element, and an access management network element. Optionally, the communication system may further include a network repository function network element.

It should be understood that the processor in embodiments of this application may be a central processing unit (CPU), or the processor may be another general-purpose processor, a digital signal processor (DSP), an application-specific integrated circuit (ASIC), a field programmable gate array (FPGA) or another programmable logic device, a discrete gate, a transistor logic device, a discrete hardware component, or the like. The general-purpose processor may be a microprocessor, or the processor may be any conventional processor or the like.

It should be further understood that the memory in embodiments of this application may be a volatile memory or a nonvolatile memory, or may include a volatile memory and a nonvolatile memory. The nonvolatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), used as an external cache. By way of example but not limitation, many forms of RAMs may be used, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchlink dynamic random access memory (SLDRAM), and a direct rambus random access memory (DR RAM).

It should be noted that when the processor is a general-purpose processor, a DSP, an ASIC, an FPGA or another programmable logic device, a discrete gate, a transistor logic device, or a discrete hardware component, the memory (a storage module) is integrated into the processor.

It should be understood that, on the premise that no conflict occurs, embodiments described in this application and/or technical features in the embodiments may be randomly combined with each other, and technical solutions obtained through combination shall also fall within the protection scope of this application.

In the several embodiments provided in this application, it should be understood that the disclosed apparatus and method may be implemented in other manners. For example, the foregoing described apparatus embodiments are merely examples. For example, division into modules is merely logical function division and there may be other division in an actual implementation.

When a method in embodiments of this application is implemented in a form of a software functional unit and sold or used as an independent product, the method may be stored in a computer-readable storage medium. Based on such an understanding, the technical solutions of this application or some of the technical solutions may be implemented in a form of a software product. The computer software product is stored in a storage medium, and includes several instructions for instructing a computer device (which may be a personal computer, a server, a network device, or the like) to perform all or some of the steps of the methods described in embodiments of this application. The storage medium includes at least any medium, for example, a USB flash drive, a removable hard disk, a read-only memory (ROM), a random access memory (RAM), a magnetic disk, an optical disc, or the like that can store program code. The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A unicast communication method, comprising:
   receiving, by a relay, a first message sent by a first terminal, wherein the first message comprises an identifier of a second terminal; and
   sending, by the relay, a second message to the second terminal when a transmission quality of the first message meets a first preset condition, wherein the second message is for establishing a unicast connection between the first terminal and the second terminal through the relay device.

2. The method according to claim 1, wherein the transmission quality of the first message meets the first preset condition
   when a reference signal received power (RSRP) of the first message is greater than or equal to a first threshold.

3. The method according to claim 1, further comprising:
   receiving, by the relay, a third message sent by the second terminal, wherein the third message comprises the identifier of the second terminal; and
   forwarding, by the first relay, the third message to the first terminal when a transmission quality of the third message meets a second preset condition.

4. The method according to claim 3, wherein the transmission quality of the third message meets the second preset condition
   when an RSRP of the third message is greater than or equal to a second threshold.

5. The method according to claim 1, further comprising:
   receiving, by the relay, indication information that indicates to the relay to change the first preset condition and/or the second preset condition.

6. The method according to claim 1, wherein the first message is for requesting to establish the unicast connection.

7. The method according to claim 1 wherein the first message is for requesting to discover a target relay.

8. An apparatus, comprising:
- at least one processor, and a memory storing instructions for execution by the at least one processor;
- wherein, when executed, the instructions cause the apparatus to perform operations comprising:
- receiving a first message sent by a first terminal, wherein the first message comprises an identifier of a second terminal; and
- sending a second message to the second terminal when a transmission quality of the first message meets a first preset condition, wherein the second message is for establishing a unicast connection between the first terminal and the second terminal through the apparatus.

9. The apparatus according to claim 8, wherein the transmission quality of the first message meets the preset condition
- when a reference signal received power (RSRP) of the first message is greater than or equal to a first threshold.

10. The apparatus according to claim 8, wherein, when executed, the instructions cause the apparatus to perform further operations comprising:
- receiving a third message sent by the second terminal, wherein the third message comprises the identifier of the second terminal; and
- forwarding the third message to the first terminal when a transmission quality of the third message meets a second preset condition.

11. The apparatus according to claim 10, wherein the transmission quality of the third message meets the second preset condition
- when an RSRP of the third message is greater than or equal to a second threshold.

12. The apparatus according to claim 8, wherein, when executed, the instructions cause the apparatus to perform further operations comprising:
- receiving indication information that indicates to the apparatus to change the first preset condition and/or the second preset condition.

13. The apparatus according to claim 8, wherein the first message is for requesting to establish the unicast connection.

14. The apparatus according to claim 8, wherein the first message is for requesting to discover a target relay.

15. A non-transitory memory storage medium comprising computer-executable instructions that, when executed, facilitate a relay to carry out operations comprising:
- receiving a first message sent by a first terminal, wherein the first message comprises an identifier of a second terminal; and
- sending a second message to the second terminal when a transmission quality of the first message meets a first preset condition, wherein the second message is for establishing a unicast connection between the first terminal and the second terminal through the relay.

16. The non-transitory memory storage medium according to claim 15, wherein that transmission quality of the first message meets the first preset condition
- when a reference signal received power (RSRP) of the first message is greater than or equal to a first threshold.

17. The non-transitory memory storage medium according to claim 15, wherein when the instructions are executed, the instructions carry out further operations comprising:
- receiving a third message sent by the second terminal device, wherein the third message comprises the identifier of the second terminal device; and
- forwarding the third message to the first terminal device when a transmission quality of the third message meets a second preset condition.

18. The non-transitory memory storage medium according to claim 17, wherein transmission quality of the third message meets the second preset condition
- when an RSRP of the third message is greater than or equal to a second threshold.

19. The non-transitory memory storage medium according to claim 15, wherein when the instructions are executed, the instructions carry out further operations comprising:
- receiving indication information that indicates to the relay to change the first preset condition and/or the second preset condition.

20. The non-transitory memory storage medium according to claim 15, wherein the first message is for requesting to establish the unicast connection.

* * * * *